(12) United States Patent
Huang

(10) Patent No.: US 8,200,251 B2
(45) Date of Patent: Jun. 12, 2012

(54) DETERMINING A LOCATION OF A MOBILE DEVICE USING A LOCATION DATABASE

(75) Inventor: Ronald K. Huang, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 234 days.

(21) Appl. No.: 12/688,788

(22) Filed: Jan. 15, 2010

(65) Prior Publication Data

US 2011/0177831 A1 Jul. 21, 2011

(51) Int. Cl.
*H04W 24/00* (2006.01)
(52) U.S. Cl. .................... 455/457; 455/404.2; 455/456.1
(58) Field of Classification Search ............... 455/404.2, 455/456.1, 456.3, 456.6, 457, 436–439; 370/331, 370/332
See application file for complete search history.

(56) References Cited

U.S. PATENT DOCUMENTS

| | | | |
|---|---|---|---|
| 5,412,388 | A | 5/1995 | Attwood |
| 5,444,450 | A | 8/1995 | Olds et al. |
| 5,508,707 | A | 4/1996 | LeBlanc et al. |
| 5,570,412 | A | 10/1996 | LeBlanc |
| 5,642,303 | A | 6/1997 | Small et al. |
| 5,913,170 | A | 6/1999 | Wortham |
| 5,945,944 | A | 8/1999 | Krasner |
| 6,122,520 | A | 9/2000 | Want et al. |
| 6,232,915 | B1 | 5/2001 | Dean et al. |
| 6,236,861 | B1 | 5/2001 | Naor et al. |
| 6,321,092 | B1 | 11/2001 | Fitch et al. |
| 6,363,255 | B1 | 3/2002 | Kuwahara |
| 6,625,457 | B1 | 9/2003 | Raith |
| 6,947,880 | B2 | 9/2005 | Johnson et al. |
| 7,120,459 | B2 | 10/2006 | Sawada et al. |
| 7,127,257 | B2 | 10/2006 | Riley et al. |
| 7,209,753 | B2 | 4/2007 | Raith |
| 7,305,245 | B2 | 12/2007 | Alizadeh-Shabdiz et al. |
| 7,346,359 | B2 | 3/2008 | Damarla et al. |
| 7,403,762 | B2 | 7/2008 | Morgan et al. |

(Continued)

FOREIGN PATENT DOCUMENTS

EP 1 843 524 10/2007

(Continued)

OTHER PUBLICATIONS

"Part 11: Wireless LAN Medium Access Control (MAC) and Physical Layer (PHY) specifications: Higher-Speed Physical Layer Extension in the 2.4 GHz Band", IEEE Std 802.11a, 1999.

(Continued)

*Primary Examiner* — Congvan Tran
(74) *Attorney, Agent, or Firm* — Fish & Richardson P.C.

(57) ABSTRACT

Methods, program products, and systems for determining a location of a mobile device using a location database are described. The mobile device can host the location database, which can store locations associated with access points. The locations can be distributed in a group of cells of a geographic grid. When the mobile device moves and connects to an access point associated with a location that is outside the group of cells, the mobile device can request an update of the location database. The mobile device can calculate a current location of the mobile device using current access points that are within a communication range of the mobile device by performing a lookup in the location database using identifiers of the current access points. The mobile device can calculate the current location using the locations corresponding to the current access points in the location database.

24 Claims, 15 Drawing Sheets

U.S. PATENT DOCUMENTS

| | | |
|---|---|---|
| 7,414,988 B2 | 8/2008 | Jones et al. |
| 7,433,693 B2 | 10/2008 | Sheynblat |
| 7,433,694 B2 | 10/2008 | Morgan et al. |
| 7,457,628 B2 | 11/2008 | Blumberg et al. |
| 7,471,954 B2 | 12/2008 | Brachet et al. |
| 7,474,897 B2 | 1/2009 | Morgan et al. |
| 7,478,578 B2 | 1/2009 | Kirkpatrick |
| 7,493,127 B2 | 2/2009 | Morgan et al. |
| 7,502,620 B2 | 3/2009 | Morgan et al. |
| 7,515,578 B2 | 4/2009 | Alizadeh-Shabdiz et al. |
| 7,528,772 B2 | 5/2009 | Ruutu et al. |
| 7,551,579 B2 | 6/2009 | Alizadeh-Shabdiz et al. |
| 7,551,929 B2 | 6/2009 | Alizadeh-Shabdiz et al. |
| 7,664,511 B2 | 2/2010 | Wang et al. |
| 7,769,396 B2 | 8/2010 | Alizadeh-Shabdiz et al. |
| 7,818,017 B2 | 10/2010 | Alizadeh-Shabdiz et al. |
| 7,974,642 B2 | 7/2011 | Lin et al. |
| 8,050,686 B1 | 11/2011 | Souissi et al. |
| 2002/0168988 A1 | 11/2002 | Younis |
| 2003/0060213 A1 | 3/2003 | Heinonen et al. |
| 2003/0087647 A1 | 5/2003 | Hurst |
| 2004/0072577 A1 | 4/2004 | Myllymaki et al. |
| 2004/0203845 A1 | 10/2004 | Lal |
| 2005/0040968 A1 | 2/2005 | Damarla et al. |
| 2005/0075119 A1 | 4/2005 | Sheha et al. |
| 2005/0239478 A1 | 10/2005 | Spirito |
| 2006/0009152 A1 | 1/2006 | Millard et al. |
| 2006/0085419 A1 | 4/2006 | Rosen |
| 2006/0095348 A1 | 5/2006 | Jones et al. |
| 2006/0095349 A1 | 5/2006 | Morgan et al. |
| 2006/0106850 A1 | 5/2006 | Morgan et al. |
| 2006/0148466 A1 | 7/2006 | Brethereau et al. |
| 2006/0172737 A1 | 8/2006 | Hind et al. |
| 2006/0200843 A1 | 9/2006 | Morgan et al. |
| 2006/0211444 A1 | 9/2006 | Koike |
| 2006/0217130 A1 | 9/2006 | Rowitch et al. |
| 2006/0217131 A1 | 9/2006 | Alizadeh-Shabdiz et al. |
| 2006/0240840 A1 | 10/2006 | Morgan et al. |
| 2006/0264222 A1* | 11/2006 | Cole et al. ............... 455/456.1 |
| 2007/0002813 A1 | 1/2007 | Tenny et al. |
| 2007/0004427 A1 | 1/2007 | Morgan et al. |
| 2007/0004428 A1 | 1/2007 | Morgan et al. |
| 2007/0010261 A1 | 1/2007 | Dravida et al. |
| 2007/0066322 A1* | 3/2007 | Bahl ....................... 455/456.1 |
| 2007/0155307 A1 | 7/2007 | Ng et al. |
| 2007/0203647 A1 | 8/2007 | Mizuochi et al. |
| 2007/0207816 A1 | 9/2007 | Spain |
| 2007/0287473 A1 | 12/2007 | Dupray |
| 2007/0290924 A1 | 12/2007 | McCoy |
| 2008/0008117 A1 | 1/2008 | Alizadeh-Shabdiz |
| 2008/0008118 A1 | 1/2008 | Alizadeh-Shabdiz |
| 2008/0008119 A1 | 1/2008 | Alizadeh-Shabdiz |
| 2008/0008120 A1 | 1/2008 | Alizadeh-Shabdiz |
| 2008/0008121 A1 | 1/2008 | Alizadeh-Shabdiz |
| 2008/0036661 A1 | 2/2008 | Smith et al. |
| 2008/0117201 A1 | 5/2008 | Martinez et al. |
| 2008/0123608 A1 | 5/2008 | Edge et al. |
| 2008/0132170 A1 | 6/2008 | Alizadeh-Shabdiz et al. |
| 2008/0139217 A1 | 6/2008 | Alizadeh-Shabdiz et al. |
| 2008/0171556 A1 | 7/2008 | Carter |
| 2008/0176583 A1 | 7/2008 | Brachet et al. |
| 2008/0186882 A1 | 8/2008 | Scherzer et al. |
| 2008/0225779 A1 | 9/2008 | Bragiel et al. |
| 2008/0259885 A1 | 10/2008 | Faulkner et al. |
| 2009/0005077 A1 | 1/2009 | Forstall et al. |
| 2009/0005080 A1 | 1/2009 | Forstall et al. |
| 2009/0005981 A1 | 1/2009 | Forstall et al. |
| 2009/0061870 A1* | 3/2009 | Finkelstein et al. ....... 455/435.2 |
| 2009/0067420 A1 | 3/2009 | Ganesan et al. |
| 2009/0070038 A1 | 3/2009 | Geelen et al. |
| 2009/0075672 A1 | 3/2009 | Jones et al. |
| 2009/0088183 A1 | 4/2009 | Piersol et al. |
| 2009/0132652 A1 | 5/2009 | Athale et al. |
| 2009/0149197 A1 | 6/2009 | Morgan et al. |
| 2009/0154371 A1 | 6/2009 | Alizadeh-Shabdiz et al. |
| 2009/0175189 A1 | 7/2009 | Alizadeh-Shabdiz et al. |
| 2009/0227270 A1 | 9/2009 | Naaman |
| 2009/0234876 A1 | 9/2009 | Schigel et al. |
| 2009/0252138 A1 | 10/2009 | Alizadeh-Shabdiz et al. |
| 2009/0275341 A1 | 11/2009 | Monnes et al. |
| 2009/0280801 A1 | 11/2009 | Malik |
| 2009/0303112 A1 | 12/2009 | Alizadeh-Shabdiz |
| 2009/0303113 A1 | 12/2009 | Alizadeh-Shabdiz |
| 2009/0303114 A1 | 12/2009 | Alizadeh-Shabdiz |
| 2009/0303115 A1 | 12/2009 | Alizadeh-Shabdiz |
| 2009/0303119 A1 | 12/2009 | Alizadeh-Shabdiz |
| 2009/0303120 A1 | 12/2009 | Alizadeh-Shabdiz |
| 2009/0303121 A1 | 12/2009 | Alizadeh-Shabdiz |
| 2009/0310585 A1 | 12/2009 | Alizadeh-Shabdiz et al. |
| 2009/0310658 A1 | 12/2009 | Garg et al. |
| 2009/0312035 A1 | 12/2009 | Alizadeh-Shabdiz et al. |
| 2009/0312036 A1 | 12/2009 | Alizadeh-Shabdiz et al. |
| 2010/0099438 A1 | 4/2010 | Oh |
| 2010/0156713 A1 | 6/2010 | Harper |
| 2010/0234045 A1 | 9/2010 | Karr et al. |
| 2010/0240369 A1* | 9/2010 | Law et al. ..................... 455/436 |
| 2010/0255856 A1 | 10/2010 | Kansal et al. |
| 2011/0047368 A1 | 2/2011 | Sundaramurthy et al. |
| 2011/0165892 A1* | 7/2011 | Ristich et al. ............... 455/456.2 |
| 2011/0176494 A1 | 7/2011 | Huang et al. |
| 2011/0176523 A1 | 7/2011 | Huang et al. |
| 2011/0177825 A1 | 7/2011 | Huang |
| 2011/0177826 A1 | 7/2011 | Huang et al. |
| 2011/0177832 A1 | 7/2011 | Huang |

FOREIGN PATENT DOCUMENTS

| | | |
|---|---|---|
| EP | 2 063 623 | 5/2009 |
| EP | 2 110 684 | 10/2009 |
| WO | WO 00/17803 | 3/2000 |
| WO | WO 2007/147451 | 12/2007 |
| WO | WO 2008/126959 | 10/2008 |
| WO | WO 2009/059964 | 5/2009 |
| WO | WO 2009/070138 | 6/2009 |
| WO | WO 2009/089308 | 7/2009 |
| WO | WO 2010/129094 | 11/2010 |

OTHER PUBLICATIONS

"Part 16: Air Interface for Fixed Broadband Wireless Access Systems", IEEE Std 802.16, 2004.

Examiner Marlene Schur, International Search Report and Written Opinion in PCT/US2011/021182 mailed Jun. 9, 2011, 12 pages.

Examiner Katarzyna Nesciobelli, International Search Report and Written Opinion in PCT/US2011/021172, mailed Apr. 5, 2011, 9 pages.

Examiner Audrey Rummery, International Search Report and Written Opinion in PCT/US2010/046707 mailed Dec. 8, 2010, 12 pages.

Spratt, "An Overview of Positioning by Diffusion," Wireless Networks; The Journal of Mobile Communication, Computation and Information, 2003(9)(6):565-574.

Koshima and Hoshen, "Personal locator services emerge," IEEE Spectrum, Feb. 2000, pp. 41-48.

* cited by examiner

DETERMINING A LOCATION OF A MOBILE DEVICE USING A LOCATION DATABASE

TECHNICAL FIELD

This disclosure relates generally to determining a geographic location for a mobile device.

BACKGROUND

A wireless communications network can employ various technologies for devices to communicate wirelessly. For example, a wireless local network (WLAN) can include a local area network (e.g., a computer network covering a relatively small physical area, like a home, office, or a small group of buildings such as a school) that uses radio waves rather than wires for communication between nodes (e.g., devices) of the network. Some examples of WLAN technology include WiFi, which can include any WLAN products that are based on any Institute of Electrical and Electronics Engineers (IEEE) 802.11 standards.

Wireless connection between a sender and a receiver can employ radio frequency (RF) technology, a frequency within the electromagnetic spectrum associated with radio wave propagation. Some exemplary radio frequencies used in WiFi are 2.5 Gigahertz (GHz) or 5 GHz. When an RF current is supplied to an antenna, an electromagnetic field can be created. The electromagnetic field can propagate through space. A component of a wireless communications network can be an access point (AP). The access point can allow a wireless mobile device to communicate with a wired network. One function of the access point can be broadcasting a wireless signal that computers equipped with wireless adapters or wireless mobile devices can detect and "tune" into.

An access point of a WiFi network can cover a geographic area determined by strength of signals sent from and received by the access point and physical characteristics of the geographic area. A variable number of mobile devices can be located within a communication range of the access point. A mobile device can be within communication range of multiple access points at the same time. A mobile device can sometimes determine its location using the locations of the access points to which the mobile device can communicate, by triangulating its location based on strength of the signals received from the access points, if the locations of the access points are known.

SUMMARY

Methods, program products, and systems for managing a location database of network-based positioning system are described. A server computer can receive location information from location-aware mobile devices (e.g., GPS-enabled devices) located within a communication range of access points of a wireless communications network. The server computer can calculate average geographic locations using the received locations for each access point. Based on the average geographic locations, the server computer can assign the access points to cells of a geographic grid. The server computer can filter the access points in each cell based on popularity, stability, longevity, and freshness of the access point and the received data. The server computer can store identifiers of the access points in association with the average geographic locations in a location database.

A mobile device can determine its location using locations of access points to which the mobile device can connect. The mobile device, upon connecting to an access point in a cell on a geographic grid, can request and receive location information of the access point, locations of other access points in the cell, and locations of access points in cells neighboring the cell. The mobile device can identify locations from the received information that are associated with access points within a communication range of the mobile device. The mobile device can calculate an average geographic location using the identified locations. The mobile device can further calculate a distance between each location and the calculated average. The mobile device can exclude locations that are sufficiently far away from the average. The mobile device can repeat the calculation and exclusion until a level of precision is achieved for the average geographic location. The mobile device can display the information on a map display of the mobile device.

Techniques for managing a location database of network-based positioning system can be implemented to achieve the following exemplary advantages. A geographic area can be associated with an access point of the wireless communications network when the actual location of the access point is unknown. The geographic area can correspond to an area where an actual mobile device that is located within a communication range of the access point is likely to be located, rather than the actual location of the access point. The geographic area can be estimated based on real time data from mobile devices, which can be updated frequently, and therefore can provide up-to-date location information. If an access point has moved away or is shut down, the access point can be removed from the database to avoid invalid location determination. The geographic area can be calculated based on data received from the mobile devices at various times of day, therefore the geographic area can correspond to various usage patterns, for example, for commute hour, business hour, or night.

Access points associated with geographic area can be used to determine a location of a non-GPS-enabled mobile device that is located within a communication range of the access point. Data transmission between the access point and the mobile device can occur at time when the mobile device is idle, in order to avoid interfering with normal communication between the mobile device and the access point. A system of determining locations of mobile devices using locations of access points can self-limit its consumption of bandwidths of the mobile devices, because the system can transmit locations of access points that are directly within communication range of the mobile devices as well as locations of access points in neighboring areas. Thus, frequent updates and re-transmissions are unnecessary even when the mobile devices move. Filtering mechanisms of access points in each cell can further limit an amount of data transmitted to the mobile device in each transmission. A mobile device can estimate its location more accurately than, for example, using signal strength to estimate the location, because signal strength can vary due to various interferences. GPS-enabled mobile devices can take advantage of the locations of wireless access points when, for example, GPS signals are weak (e.g., inside buildings).

The details of one or more implementations of managing a location database of network-based positioning system are set forth in the accompanying drawings and the description below. Other features, aspects, and advantages of managing a location database will become apparent from the description, the drawings, and the claims.

BRIEF DESCRIPTION OF THE DRAWINGS

Like reference symbols in the various drawings indicate like elements.

DETAILED DESCRIPTION

Overview of Managing a Location Database

Figure 1A:
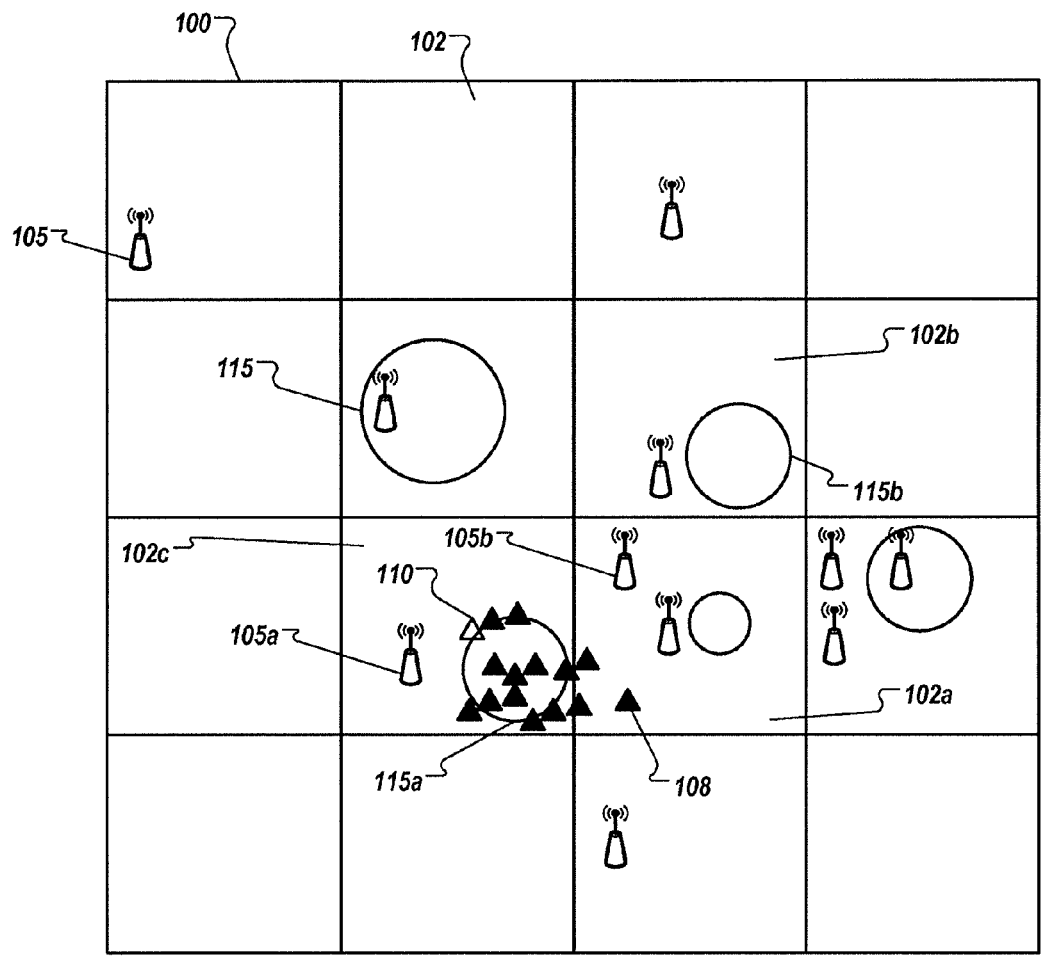
FIG. 1A is an overview of techniques of managing a location database.

FIG. 1A is an overview of techniques of managing a location database for network-based position system. A wireless local area network (WLAN) can be a radio communications network that includes a number of access points 105. Access points 105 can include a hardwire device or computer software that can act as a communication hub for wireless devices to connect to a wired network. Multiple access points 105 can be distributed in an area (e.g., an office building or an airport).

Access point 105 can communicate with wireless devices (e.g., mobile devices 108 and 110) using various communication protocols. In some implementations, access point 105 can be an access point of a WiFi™ network, which implements an Institute of Electrical and Electronics Engineers (IEEE) 802.11 based protocol (e.g., IEEE 802.11a). In some implementations, access point 105 can be an access point of a worldwide interoperability for microwave access (WiMAX) network, which implements an IEEE 802.16 based protocol (e.g., IEEE 802.16-2004 or IEEE 802.16e-2005). Access point 105 can have a communication range that can reach from location of access point 105 to anywhere from less than ten meters to several hundred meters, depending on factors including configuration of access point 105 and physical surroundings. Multiple wireless devices 108 and 110 can connect to an access point when mobile devices 108 and 110 are within the communication range of access point 105. In turn, multiple access points 105 can be available to a single mobile device 108 or 110 for connection. Mobile devices 108 and 110 can select a particular access point 105 to which mobile devices 108 and 110 can connect based on various factors. For example, the selection can be based on whether mobile device 108 is authorized to connect to access point 105a, or whether access point 105a can provide the strongest signal for the wireless connection to mobile devices 108.

The system can determine location areas 115 that are associated with access points 105. Location areas 115 can be calculated such that they indicate where mobile devices 108 located within a communication range of access points 105 are likely to be located. The system can make the determination based on known locations from mobile devices 108 that are located within a communication range of access points 105. Mobile devices 108 can be location-aware mobile devices, for example, GPS-enabled mobile devices that have built-in, or be coupled with, receivers that can receive Global Positioning System (GPS) signals and determine locations using the GPS signals. Location-aware mobile devices 108 are represented as black triangles in FIG. 1A. When location-aware mobile devices 108 are located within a communication range of a particular access point 105 (e.g., access point 105a), location-aware mobile devices 108 can transmit the locations of the devices to access point 105a. Access point 105a can relay the transmission, as well as an identifier of access point 105a, to the system. The system can determine an estimated location area 115a where any mobile device 108 or 110 located within a communication range of access point 105a is most likely located. In this specification, estimated location areas 115 will be referred to as presence areas, to indicate that mobile device 108 or 110, when located within a communication range of a particular access point 105, is likely to be present.

To calculate presence areas 115, the system can apply an iterative process (e.g., by performing a multi-pass analysis). The iterative process can determine a presence area (e.g., presence area 115) that is associated with an access point (e.g., access point 105) as a circle. The circle can have a center that corresponds to an average geographic location calculated based on locations of location-aware mobile devices 108 that are connected to access point 105. The circle can have a radius that corresponds to an error margin, which can be determined by, for example, a distance between a location of a mobile device 108 and the average geographic location. Further details on the iterative process will be described below in reference to FIGS. 2 and 3. The iterative process can be executed periodically (e.g., every six hours) to capture different wireless access usage patterns during different hours of a day as well as to capture potential moves of access points 105.

The system can send information of presence areas 115 to mobile devices, including non-GPS-enabled mobile devices (e.g., mobile device 110), that are located within a communication range of access points 105 such that the receiving mobile devices can determine estimated locations of the devices using presence areas 115. For example, if mobile device 110 is located within a communication range of access point 105b, the location of mobile device 110 can be estimated as to coincide with presence area 115b that is associated with access point 105b.

In a given area (e.g., an airport), numerous access points 105 can exist. Further more, as mobile device 110 can be mobile, it can be logical to send locations of access points that are not immediately within a communication range of mobile device 110 but are close-by enough to mobile device 110, such that mobile device 110 can use the locations to track its movement. To avoid sending a large amount of location data to mobile device 110, the system can filter access points 105 and location areas 115 such that only the location data of a limited number of access points (e.g., access point 105a), rather than location data of every single access points that exists in the world, are transmitted. Filtering can be based on various factors, including popularity, stability, longevity, and freshness of locations 115 and access points 105.

To filter locations 115 and access points 105, the system can create geographic grid 100 that contain cells 102. Cell 102 can be a polygon having a substantially rectangular shape, the polygon corresponding to a geographic area identifiable on geographic grid 100 by a latitude and a longitude of an identifying point of the geographic area (e.g., a center, or a corner), and a size (e.g., a length measured in degrees of longitude, and a width measured in degrees of latitude). Each cell 102 can be used as a container that can contain a certain number of locations. For example, cell 102 can be a rectangle whose length is 0.0005 degrees meridian (approximately 56 meters) and whose width 0.0005 degrees latitude (width in meters can vary depending on the latitude). Cell 102 can be configured to hold a number (e.g., three) of presence areas 115 corresponding to access points 105. In some implementations, cell 102 can "hold" presence area 115 if the center of presence area 115 is located within boundaries of cell 102. The presence areas 115 can be selected from all presence areas 115 that are located in cell 102 based on one or more reliability factors. The selection can be based on various criteria such as popularity, stability, longevity, and freshness.

A particular access point (e.g., access point 105b) and the presence area associated with the access point (e.g., presence area 115b) need not be located in a same cell 102. This can happen, for example, when access point 105b is located on a building in cell 102a and most mobile devices 108 located within a communication range of access point 105b are located in another building in cell 102b. In some implementations, the system can ignore the actual location of access point 105b.

When mobile device 110 connects to an access point (e.g., access point 105a, whose associated presence area 115a is located in cell 102c), or connected to the system in other ways (e.g., through a cellular network), mobile device 110 can receive a location update from the system. The location update can include all presence areas 115 that are located in the same cell where presence area 115a is located (e.g., cell 102c). The location update can further include presence areas 115 that are located in other cells 102 (e.g., cell 102a and cell 102b) that are neighbors to cell 102c on geographic grid 100.

When mobile device 110 connects to access point 105a, mobile device 110 can detect other access points 105 (e.g., access point 105b) that are available. Mobile device 110 can identify presence areas (e.g., presence areas 115a and 115b) for the available access points. Mobile device 110 can calculate a current location of mobile device 110 using various algorithms. For example, when only one presence area 115a is identified, mobile device 110 can designate presence area 115a as the current location of mobile device 110. When two or more presence areas 115 are identified, mobile device 110 can calculate its current location using an iterative process (e.g., a multi-pass analysis). The iterative process can calculate an average location of the presence areas, calculate distances between the presence areas and the average location, and exclude presence areas that are the farthest away from the average location. Mobile device 110 can repeat the iterations until a precision requirement is satisfied for determining a location of mobile device 110. Mobile device 110 can designate the average location as a current location of mobile device 110 and display the average location on a map display device.

In some implementations, the location update received on mobile device 110 from the system can include numerous neighboring cells such that a sufficiently large area (e.g., one or two square kilometers) around presence area 115a can be covered. Based on the location update that covers the large area, mobile device 110 can avoid having to request frequent updates when mobile device 110 moves. Mobile device 110 can have opportunities to receive updated presence area information when, for example, mobile device 110 is idle or otherwise has available communication bandwidth.

Figure 1B:
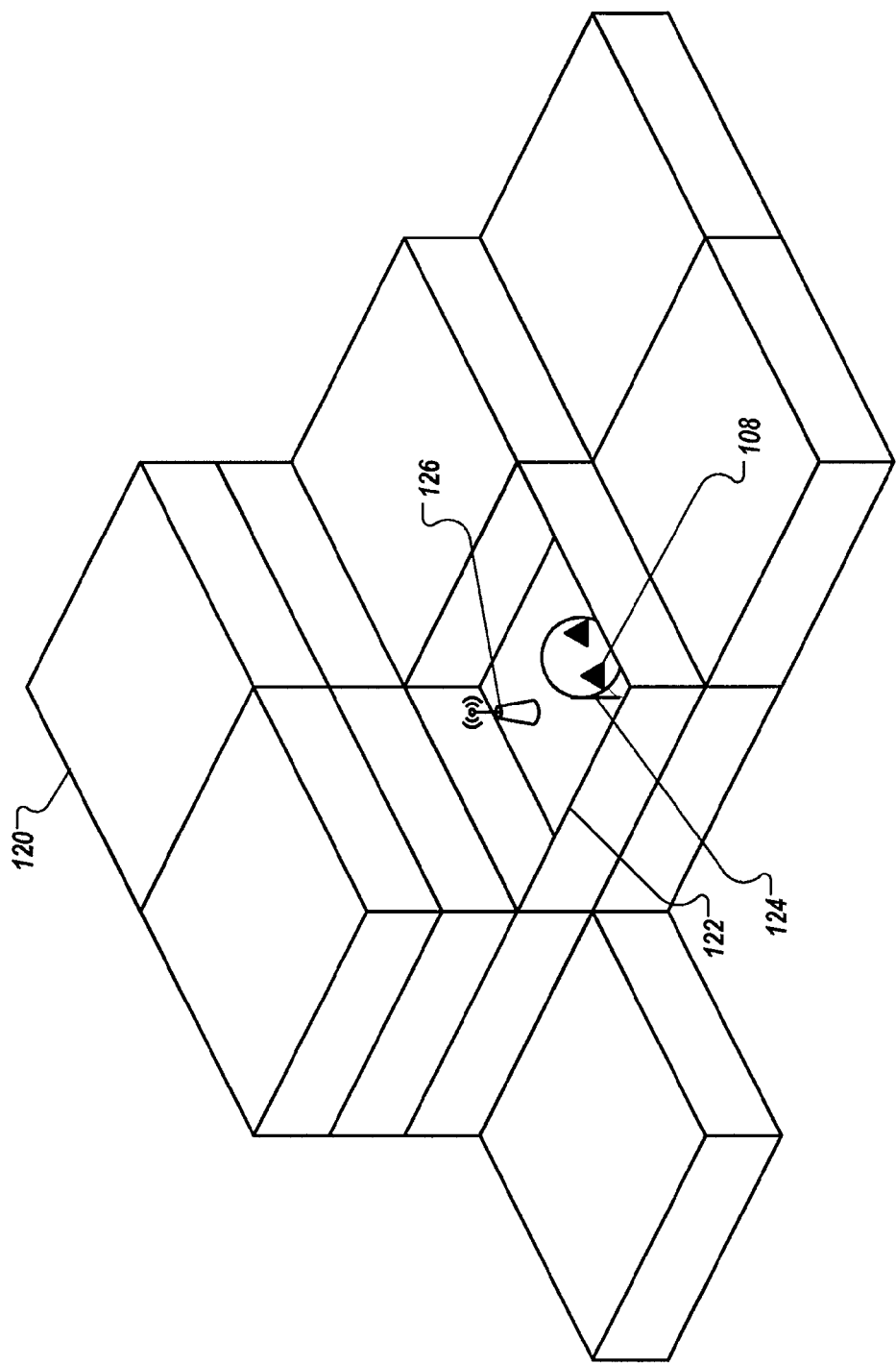
FIG. 1B illustrates techniques of managing a location database in a three-dimensional space.

FIG. 1B illustrates managing a location database in a three-dimensional space. Some location-aware mobile devices 108 (e.g., GPS-enabled devices) can identify locations in a three-dimensional space. The locations can be represented by latitudes, longitudes, and altitudes. Altitudes can be expressed, for example, as elevation measured in meters from sea level. Locating a mobile device in a three-dimensional space can be desirable when an altitude of the mobile device is necessary for locating the mobile device. For example, altitude can be used to determine on which floor the mobile device is located in a high-rise building. Location of mobile device 108 in three-dimensional space can be displayed on a two-dimensional map with the elevation as an annotation, or on a three-dimensional map.

Mobile devices 108 can connect to access point 126. Mobile devices 108 can be location-aware mobile devices that can transmit their locations, including latitude, longitude, and altitude coordinates to the system. The system can calculate an average location based on the latitude, longitude, and altitude coordinates received from mobile devices 108. Three-dimensional space 124, having the average location as a center and an error margin as a radius, can be associated with access point 126. Space 124 can represent a space that a mobile device is likely to be located when the mobile device is located within a communication range of access point 126. In this specification, space 124 will be referred to as a presence space.

The system can send information on presence space 124 to mobile devices that are located within a communication range of access point 126. The mobile devices receiving the information can use the information to determine their geographic locations. The system can divide a three-dimensional geographic space into three-dimensional grid 120. Three-dimensional grid 120 can be composed of three-dimensional cells 122. Each three-dimensional cell 122 can have a base that corresponds to cell 102 of geographic grid 100. Each three-dimensional cell 122 can have a height (e.g., measured in meters) as a dimension. Presence space 124 can be referred to as being located in cell 122 if the center of presence space 124 is in cell 122. The system can limit the number of presence spaces in cell 122 based on a popularity of the presence space (e.g., how many connections are made from mobile devices 108 in presence space to access point 126), a stability of presence space 124 (e.g., how stable presence space 124 has been), a longevity of access point 126 (e.g., how long access point 126 has existed), and a freshness of presence space 124 (e.g., when was a latest location transmission from mobile device 108 located within a communication range of access point 126 was received).

The system can transmit information on presence space 124 and neighboring presence spaces based on three-dimensional cells 122 of three-dimensional grid 120 to a mobile device (e.g., mobile device 110) that is located within a communication range of access point 126. Mobile device 110 can use the information to estimate a current location of mobile device 110 in the three-dimensional space, and display the estimated current location on a three-dimensional map.

Exemplary Server-Side Process and System for Managing a Location Database

Figure 2A:
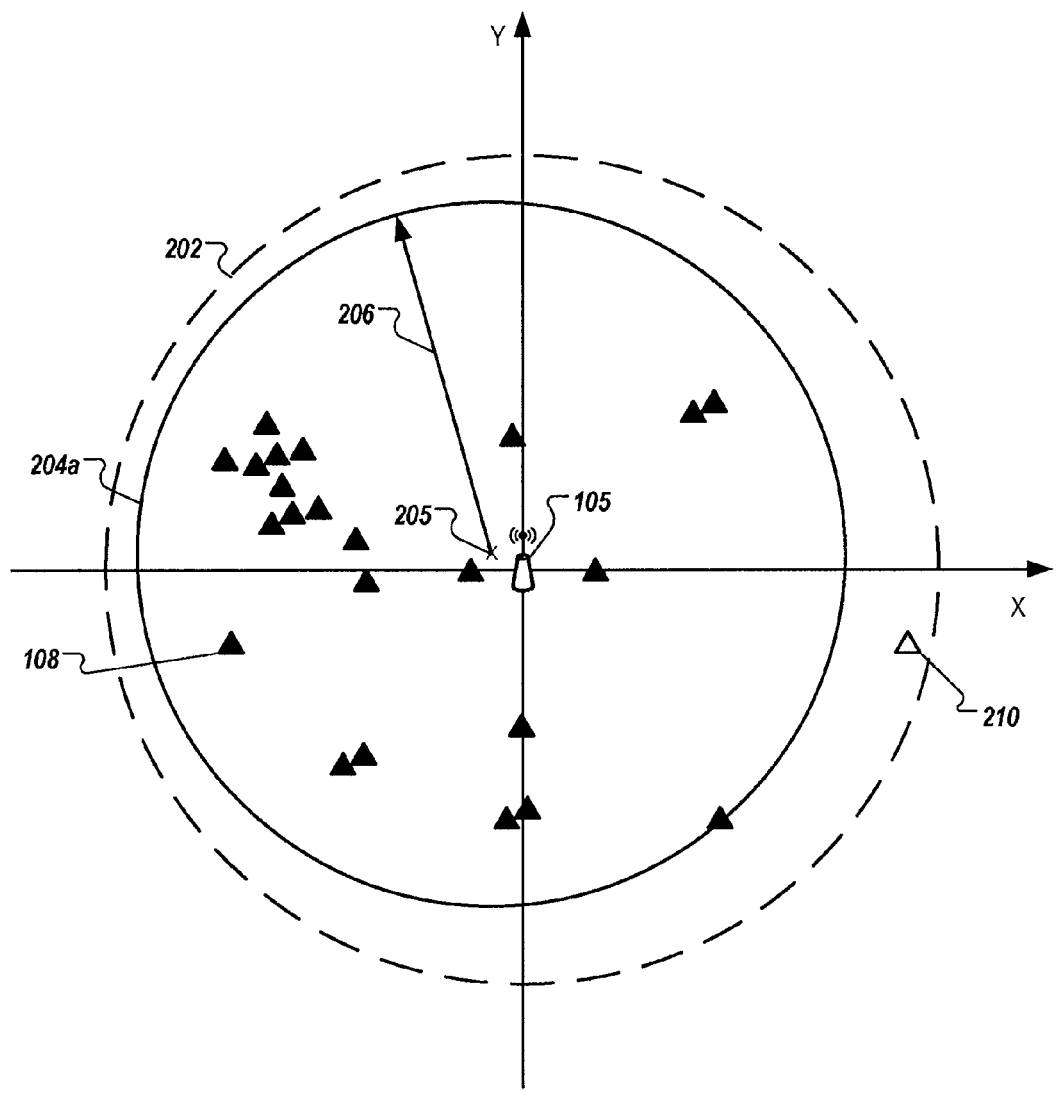
FIGS. 2A-2C illustrate exemplary stages of determining locations associated with access points in WLAN using mobile devices.
Figure 2B:
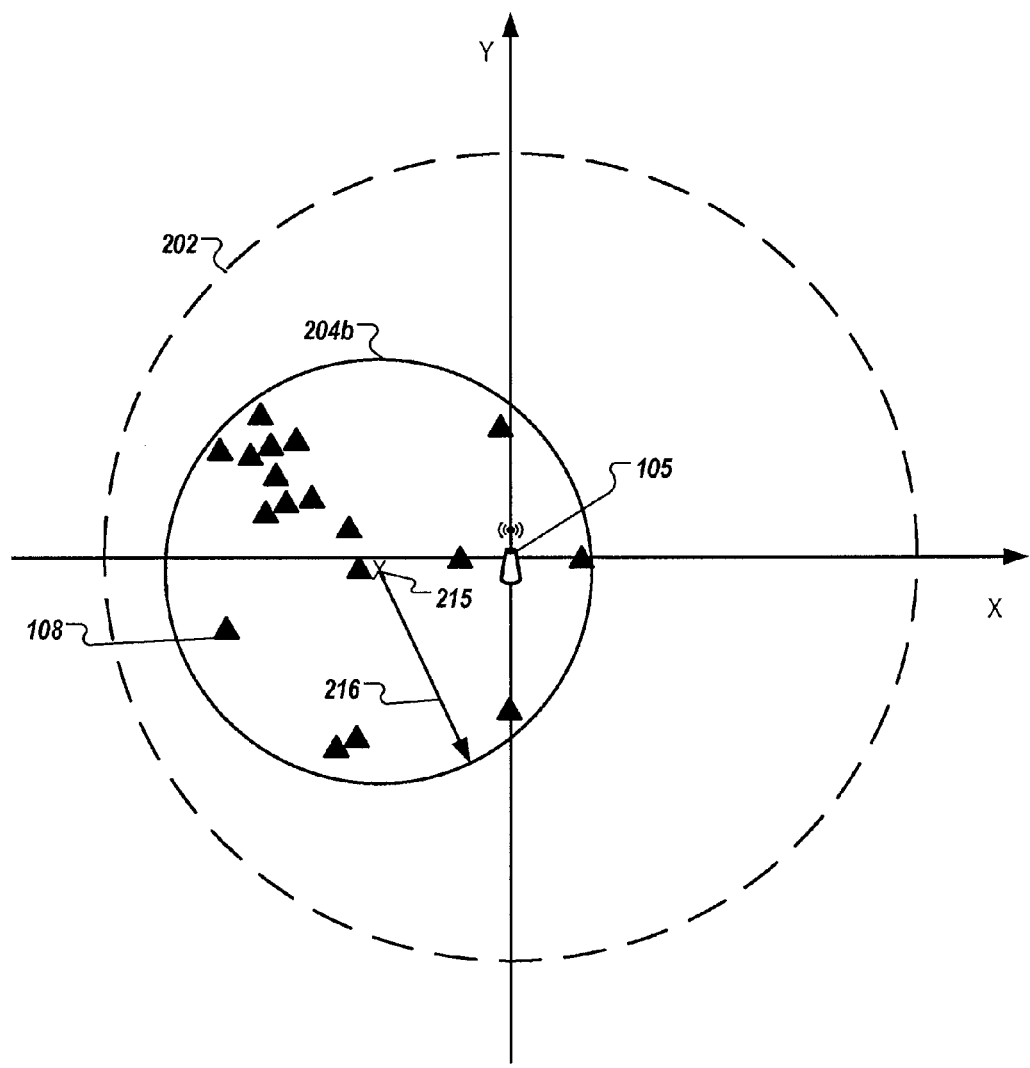
Figure 2C:
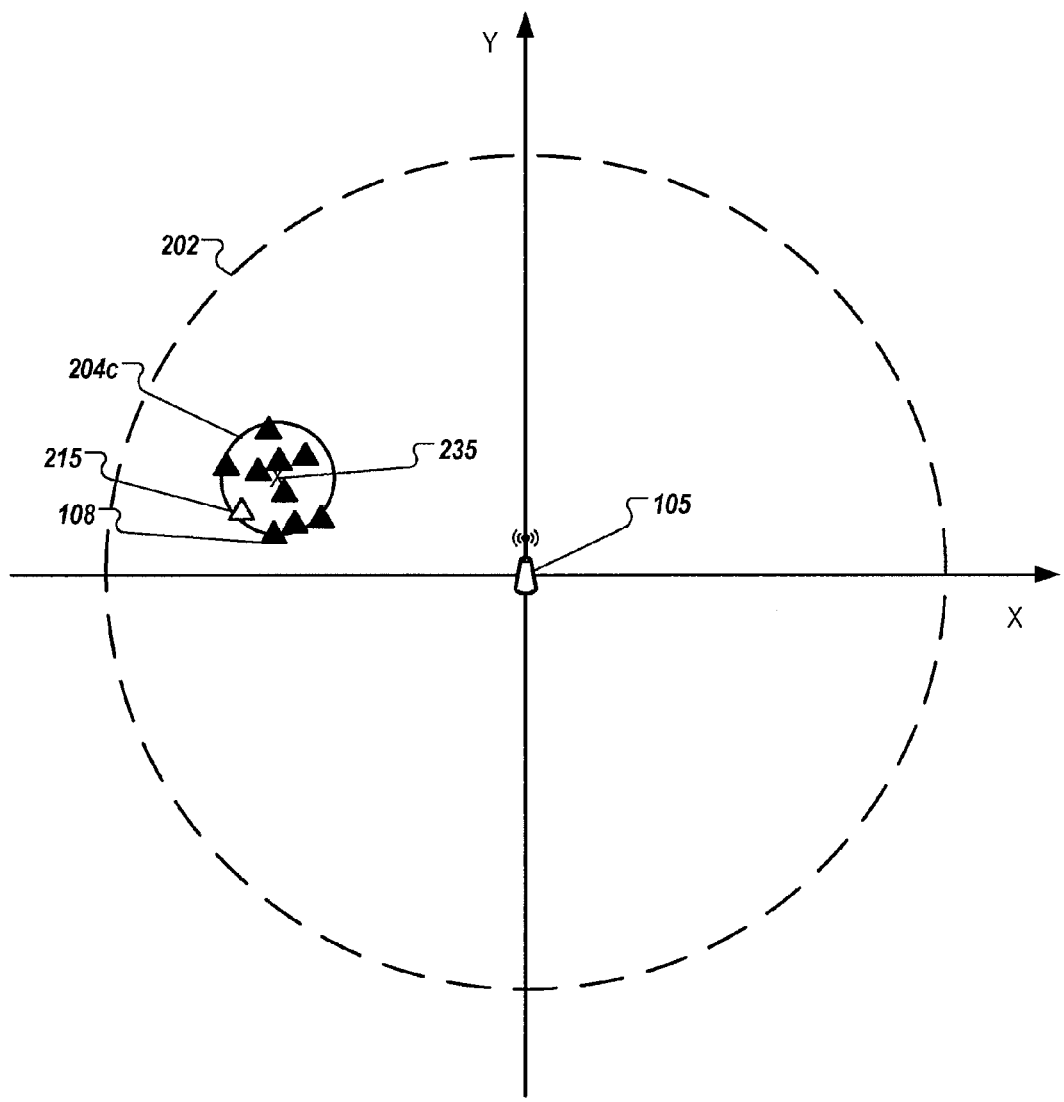

FIGS. 2A-2C illustrate exemplary stages of managing a location database. For convenience, the techniques will be described in reference to a network-based positioning system that includes a server that implements the techniques.

FIG. 2A illustrates an exemplary stage of a multi-pass analysis that can be used to determine a presence area associated with access point 105. Access point 105 can have a coverage area 202, which can be determined by a signal strength of a transmitter of access point 105 and other factors (e.g., physical characteristics of geographic areas surrounding access point 105). Mobile devices 108 that are located within coverage area 202 can wirelessly connect to access point 105. Access point 105 can allow mobile devices 108 to connect to a wired network through various gateways. The wired network can include a data network (e.g., the Internet), a public switched telephone network (PSTN), other digital or analog networks, or a combination of the above.

Mobile device 108 can include location-aware mobile devices (e.g., GPS-enabled mobile devices). Each location-aware mobile devices 108 (represented as black triangle of FIG. 2A) can detect its current geographic location. The current geographic location can be represented by geographic coordinates that include a latitude and a longitude of mobile device 108. When mobile devices 108 communicate with access point 105, mobile devices 108 can transmit location information to the system through access point 105. The location information can be associated with an identifier of access point 105 (e.g., a Media Access Control (MAC) address of access point 105). The system can use the location information received from multiple mobile devices 108 to determine the presence area that can be associated with access point 105. The presence area does not necessarily enclose a location where access point 100 is actually located. Neither is it necessary for the presence area to correspond to the geometric location or shape of coverage area 202, although the presence area can be located within coverage area 202.

Distribution of mobile devices 108 with coverage area 202 can correspond to a snapshot of mobile devices 108 at a particular time (e.g., 8:30 am local time for a time zone in which access point 105 is located). Each mobile device 108 can be associated with a single location. Distribution of mobile devices 108 with coverage area 202 can also correspond to locations of mobile devices 108 over a period of time (e.g., six hours from 4 am to 10 am). Each mobile device 108 can be associated with multiple locations (e.g., when mobile device 108 is moving). A single mobile device 108 that is associated with multiple locations can be represented by multiple locations in the system, as illustrated by multiple triangles in FIG. 2A.

The server can determine an average geographic location of a set of locations received from mobile devices 108. The set of locations can include locations received from mobile devices 108 at a particular time or during a particular time period. The average geographic location can be designated as center 205 of area encompassed by circle 204a. The center of circle 204a need not coincide with the location of access point 105. The server can calculate a distance between the average geographic location and each location in the set and identify one or more outliers. Outliers can be locations in the set that are located the farthest from the average geographic location. Outliers (e.g., location 210) whose distances to the center exceed a threshold can be excluded from the set. Circle 204a can have radius 206 that corresponds to the longest distance between the average geographic location and locations in a current set after the outliers are excluded.

FIG. 2B illustrates an exemplary stage of the multi-pass analysis subsequent to the stage of FIG. 2A. Locations whose distances to the average geographic location of FIG. 2A (center 205 of circle 204a) exceed a threshold have been excluded from the set. The threshold can be configured such that a percentage of positions (e.g., five percent of locations of FIG. 2A) are excluded. A new average geographic location can be calculated based on the locations remaining in the set (e.g., the 95 percent of locations remaining). The new average geographic location can be, for example, a center 225 of circle 204b. In various implementations, calculating the new average geographic location can include averaging the remaining locations in the set, selecting a medium geographic location in the set (e.g., by selecting a medium latitude or a medium longitude), or applying other algorithms. Algorithms for calculating the average geographic location can be identical in each pass of the multi-pass analysis, or be distinct from each other in each pass.

Area encompassed by circle 204b can be smaller than the area encompassed by circle 204a as determined in a prior pass when outlier locations are excluded. The smaller area can reflect an increased precision of the calculation. The center 225 of circle 204b does not necessarily coincide with center 205 of circle 204a. In some implementations, radius 216 of circle 204b can correspond to a remaining location of mobile device 108 that is farthest away from the center 225 of circle 204b. Radius 216 can represent an error margin of the new estimation the presence area calculated in the current pass.

FIG. 2C illustrates an exemplary final stage of the multi-pass analysis. When certain exit conditions are satisfied, the system can terminate the iterative process after the final stage. The final stage can produce a final average geographic location that corresponds to a cluster of positions of mobile devices 108. The final average geographic location can be represented as a center 235 of circle 204c. Circle 204c can have a radius that corresponds to a final error margin, which is based on a distance between the final average geographic location and a location in the cluster. Circle 204c can be designated as the presence area associated with access point 105 through and identifier (e.g., a MAC address) of access point 105.

The server can determine whether to include the identifier of access point 105 and associated presence area in a location database based on various factors. For example, the server can count the number of presence areas in cell 102 of geographic grid 100, and select a number of presence areas based on popularity, stability, and longevity. The server can send information of the presence areas (including presence area 204c if presence area 204c is selected) in the location database to a mobile device (e.g., mobile device 215), regardless whether mobile device 215 is GPS-enabled.

Figure 2D:
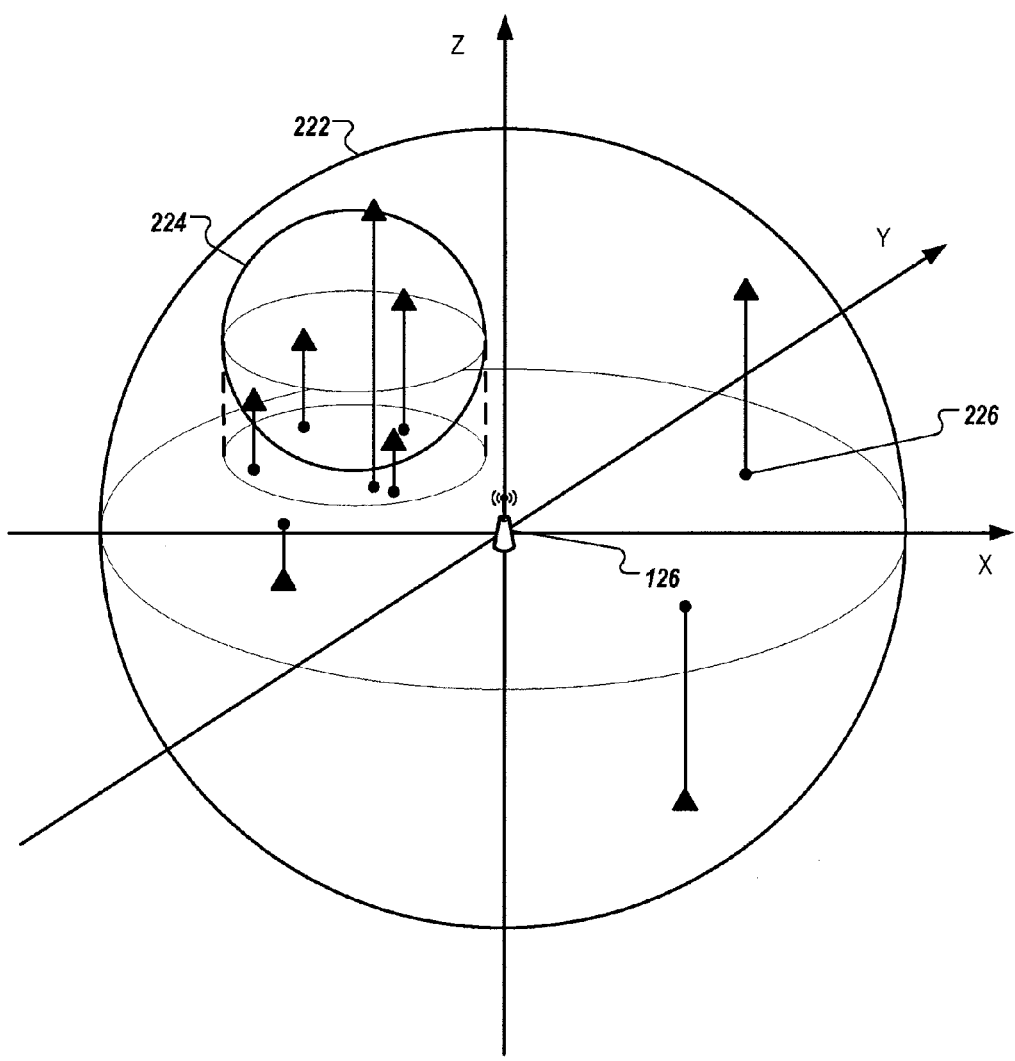
FIG. 2D illustrates an exemplary stage of determining locations associated with access points in WLAN using mobile devices in a three-dimensional space.

FIG. 2D illustrates an exemplary stage of managing a location database in a three-dimensional space. In FIG. 2D, axes X, Y, and Z can be used to indicate the three-dimensional space. For example, axes X, Y, and Z can represent longitude, latitude, and altitude, respectively. For convenience, location of access point 126 is shown to coincide with point zero on the X, Y, and Z axes in FIG. 2D. In some implementations, an actual location (e.g., latitude, longitude, and altitude coordinates) of access point 126 is optional in the calculations.

Each triangle of FIG. 2D can represent a location of a mobile device located in the three-dimensional space. The locations can have projections (e.g., projection 226) on a plane in the three-dimensional space. The plane can be defined at arbitrary altitude (e.g., the altitude of access point 126). For example, the plane can be defined by axes X and Y. Access point 126 can correspond to a coverage space 222, which can be determined by signal strength of access point 126 and other limiting factors (e.g., floors, ceilings, buildings in signal path).

A multi-pass analysis can associate a geographic space with access point 126 of a WLAN-based on a set of locations received from location-aware mobile devices 108 that are located in cell space 202. In a pass of the multi-path analysis, an average geographic location (e.g., center of space 224) can be determined by, for example, averaging the latitudes, longitudes, and altitudes coordinates of locations in the set. Distances between the average geographic location and locations in coverage space 222 can be calculated. Locations that are within coverage space 222 but are sufficiently far away from the average geographic location can be excluded from the set and from further computations. A radius of space 224 can be determined by, for example, the farthest distance between remaining locations in the set and the average geographic location.

The system can repeat the stages of calculating an average geographic location in a set, calculating distances between the average geographic location and the locations in the set, and excluding from the set locations based on the calculated distances. The repetition can continue until an exit condition is satisfied. A space having a center at the average geographic location and a radius that is based on a distance between the average geographic location and a remaining location in the set can be designated as a presence space that can be associated with access point 126.

Figure 3A:
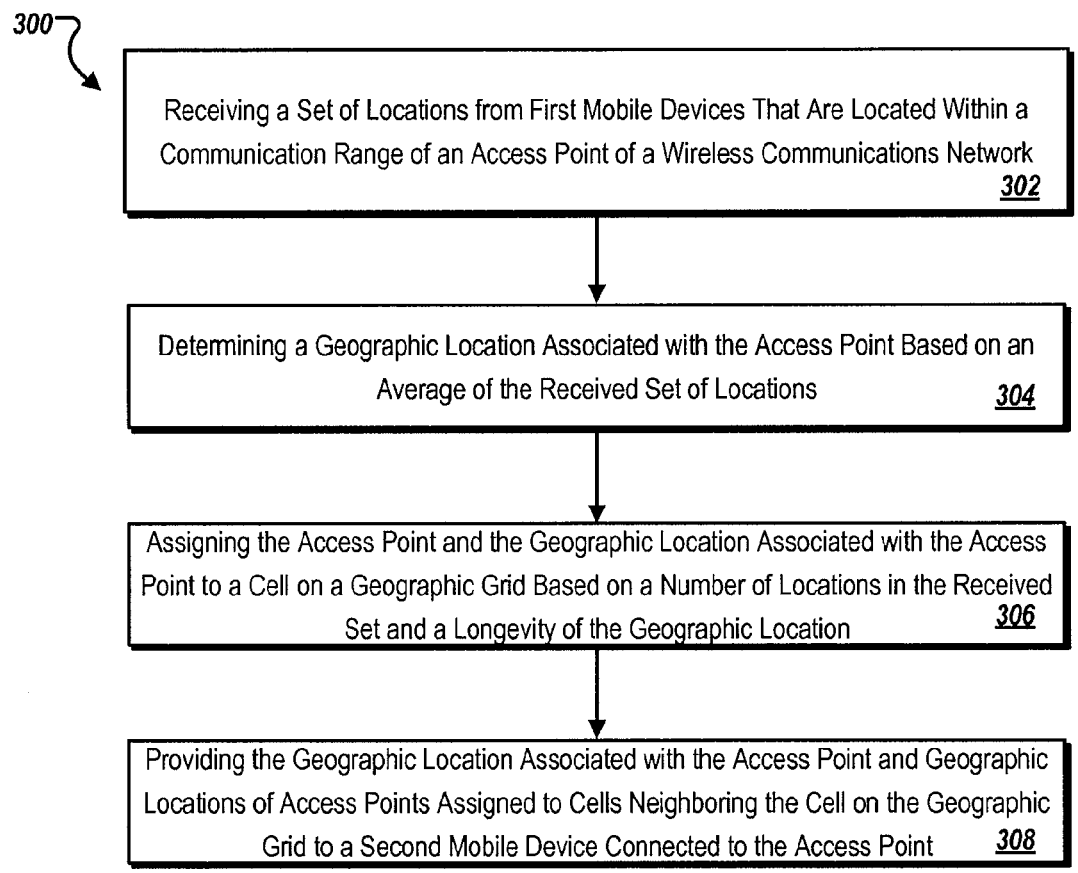
FIGS. 3A and 3B are flowcharts illustrating exemplary processes of determining locations associated with access points in WLAN using mobile devices.

FIG. 3A is a flowchart illustrating exemplary process 300 of managing a location database. Process 300 can be used, for example, to determine a presence area or presence space associated with an access point of the WLAN. The presence area or presence space can be used to determine a location of a non-GPS-enabled mobile device. For convenience, process 300 will be described in reference to a system that implements process 300.

The system can receive (302) a set of locations from one or more first mobile devices 108 located within a communication range of access point 105. Each location can be represented by a set of geographic coordinates (e.g., a latitude, a longitude, and an altitude). The location can be associated with an identifier (e.g., a MAC address) of access point 105. The identifier of access point can be automatically supplied by access point 105 when access point 105 communicates with the system. In various implementations, the set of locations can correspond to a period of time (e.g., 6 hours, or from 6 am to 10 am of a time zone in which access point 105 is located).

In some implementations, the period of time can be configured to reflect characteristics of specific usage patterns at various hours of a day. An area where mobile devices located within a communication range of access point 105 are most likely located can vary during the day, indicating various usage patterns in specific hours. For example, the period of time can correspond to "commute time," "business hours," "night time," etc. The characteristics of the time of the day can correspond to various usage patterns of mobile devices 108. For example, during commute time, the presence area associated with access point 105 can be at or near a freeway; during business hours, the presence area associated with access point 105 can be at or near an office building; at nighttime, the presence area associated with access point 105 can spread out without a particular point of concentration. The system can calculate the presence area based on locations received, for example, from 4 am to 10 am, and recalculate the presence area based on location received from 10 am to 4 pm, etc. Locations received in each characteristic time period can be grouped into a set in the system. The locations can be stored in any data structure (e.g., set, list, array, data records in a relational database, etc.) on a storage device coupled to the server.

The system can determine (304) a geographic location associated with access point 105 based on an average of the received set of locations. The geographic location can include a presence area or a presence space as described above. The presence area or presence space can be associated with access point 105 by, for example, the MAC address of access point 105. In some implementations, determining the geographic location can include applying a multi-pass algorithm on the received set of locations, including excluding at least one location from the set in each pass. Determining the geographic location can include applying the multi-pass algorithm periodically.

The system can assign (306) access point 105 and the geographic location associated with access point 105 to a cell (e.g., cell 102) on a geographic grid (e.g., geographic grid 100) based on various factors including popularity of access point 105, stability of the geographic location, and longevity of access point 105. In some implementations, popularity of access point 105 can measure how many mobile devices 108 are located within a communication range of access point 105. Popularity of access point can be measured by, for example, how many locations of mobile devices 108 that are located within a communication range of access point 105 are received in a period of time by the system.

Stability of the presence area associated with access point 105 can reflect how reliable the presence area is, if the presence area is used for estimating a location of a device located within a communication range of access point 105. Stability of the presence area associated with access point 105 can be measured by, for example, comparing the presence areas calculated by the last two calculations, and determine a degree of overlap between the presence areas. The higher the degree of overlap, the more stable the presence area.

Longevity of access point 105 can reflect the quality of the data associated with access point 105. For example, an access point that has been in the database for a longer time can be more reliable than an access point that has been recently added. Longevity of access point 105 can be measured by a history of data in a location database.

In some implementations, a freshness of data can also be used to determine whether the presence area associated with access point 105 will be assigned to cell 102 of geographic grid 100. The freshness of data can be measured by how long ago the system received the most recent location from mobile device 108.

The system can rank each presence area located in cell 102 of geographic grid 100 based on the popularity, stability, longevity, and freshness. At least a portion of all the presence areas located in cell 102 (e.g., three presence areas, including the presence area that is associated with access point 105) can be assigned to cell 102. Assigned access points and presence areas can be used for locating mobile devices (e.g., mobile devices 110) that are located within a communication range of access point 105. Unassigned presence areas can be stored in the location database for future use.

The system can provide (308) the geographic location associated with access point 105 to a second mobile device (e.g., mobile device 110) that is located within a communication range of access point 105. The system can further provide other geographic locations located in the same cell, as well as geographic locations associated with access points assigned to neighboring cells to the second mobile device.

The locations can be transmitted from access point 105 to the second mobile device upon request or using various push or broadcast technologies.

In some implementations, the system can receive, process, and transmit three-dimensional location information. Presence spaces (e.g., presence space 124) can be assigned to three-dimensional cells (e.g., three-dimensional cell 122) on a geographic three-dimensional grid (e.g., three-dimensional grid 120). The locations can be transmitted from access point 126 to a second mobile device that is located within a communication range of access point 126 upon request or using various push or broadcast technologies.

Figure 3B:
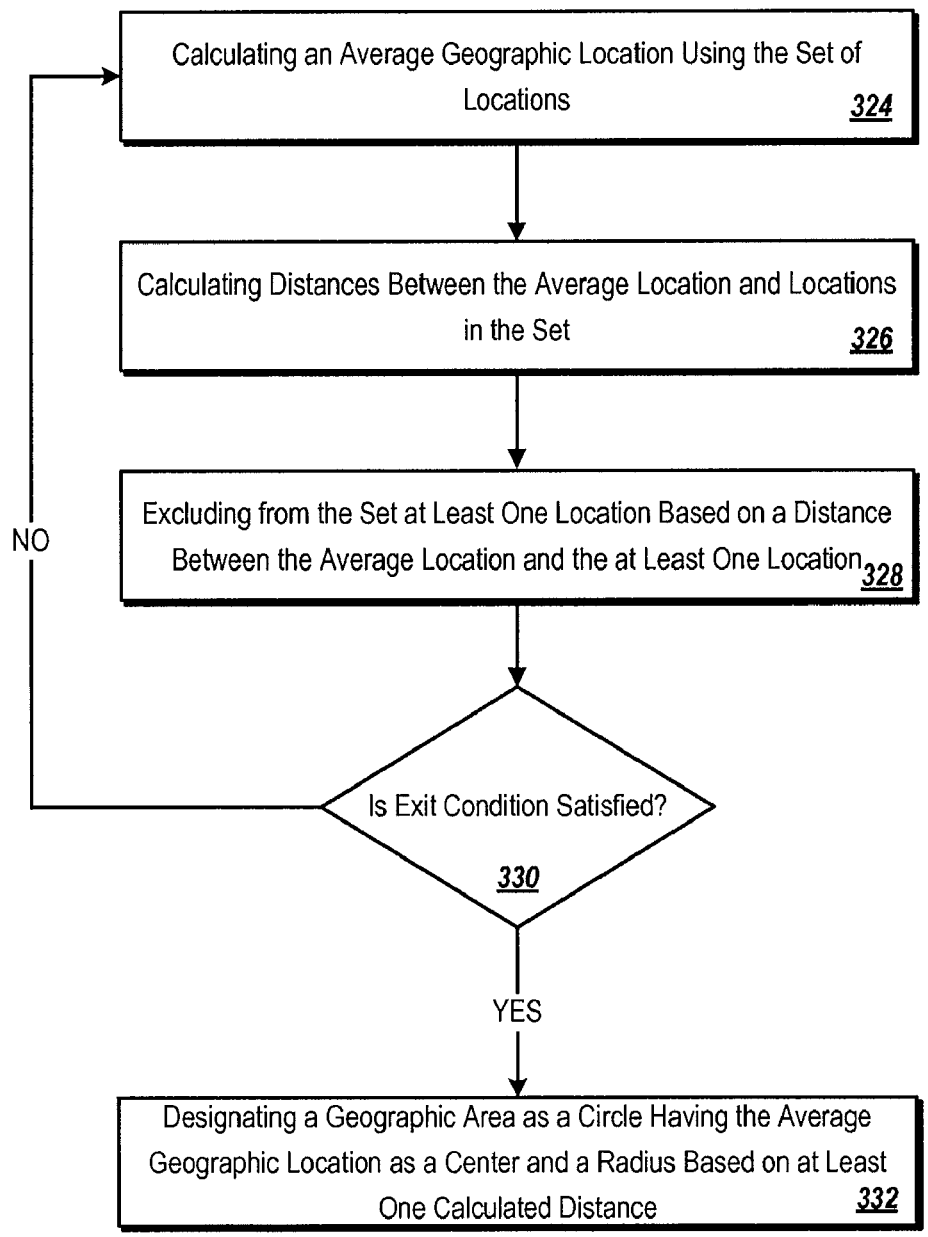

FIG. 3B is a flowchart illustrating an exemplary process 304 of calculating an average geographic location using a set of locations. For convenience, process 304 will be described in reference to a system that implements process 304.

The system can calculate (324) an average geographic location using the locations in the set. Calculating the average geographic location can include calculating an average of latitudes, longitudes, and altitudes of the locations in the set, and designating a position at the calculated average latitude, longitude, and altitude as the average geographic location. In some implementations, calculating the average geographic location can include designating a position at a median latitude, median longitude, and median altitude of the positions in the set as the average geographic location.

The system can calculate (326) distances between the locations in the set and the average geographic location. In some implementations, the system can calculate a linear distance between each of the locations in the set and the average geographic location in Euclidean space. In some implementations, the system can calculate a geodesic distance between each of the locations in the set and the average geographic location, taking curvature of the earth into consideration.

The distances calculated in stage 326 can be designated as a radius associated with a center. The center can be the average geographic location calculated in stage 324, which can be a center of a circle (e.g., circle 204a). The radius of the circle can be determined based on at least one distance between a location in the set of locations and the average geographic location. In some implementations, the radius can equal to the longest distance between the average geographic location and a location remaining in the set. In some implementations, the radius can be a distance that, when circle 106d is drawn using the radius and the average geographic location as a center, the circle can enclose a percentage (e.g., 80 percent) of the locations remaining in the set. The radius can represent a margin of error beyond which an estimation of a location of a non-GPS-enabled mobile device is less likely to be statistically meaningful.

The system can exclude (328) from the set at least one location based on a distance between the average location and the location. In some implementations, the system can exclude locations whose distance to the average geographic location exceeds a threshold distance. In each pass of the multi-pass analysis, the system can increase a precision of the estimated average geographic location by excluding locations that appear to be away from a concentration of locations (e.g., a cluster). A location that is away from a cluster of locations can be less useful in estimating the presence area associated with access point 105, and can be excluded. In various implementations, the threshold distance can vary from one pass to a next pass. In some implementations, the threshold distance can be a distance to the average geographic location within which a certain percentage (e.g., 95 percent) of locations in the set are located. In some implementations, the threshold distance can be a set of distances corresponding to the passes (e.g., 250 meters for the first pass, 150 meters for the second pass, etc.). The system can exclude at least one location from the set when the distance between the average geographic location and the location exceeds the threshold distance.

The system can repeat stages 324, 326, and 328 of process 304 until an exit condition is satisfied. The system can determine (330) whether an exit condition is satisfied for terminating the repetition. In some implementations, the exit condition can be satisfied when a number of repetitions reach a threshold number (e.g., 10 times). The threshold number, as well as the percentage of locations to exclude, can be configurable to fine tune a balance between certainty (e.g., a larger presence area can result in more confidence that a mobile device in the cell is actually located in the presence area) and precision (e.g., a smaller presence area can result in more accurate location of a mobile device). For example, when the percentage is set to 95 percent and the number of passes is set to 10, the final pass can produce a circle that encompasses about 60 percent of all location data points.

In some implementations, the exit condition of stage 330 can be satisfied when the presence area or presence space is sufficiently small. In cells where mobile devices are highly concentrated, a presence area can be sufficiently small that further passes will not necessarily increase the precision. The repetition of stages 324, 326, and 328 can terminate when the radius of the circle reaches below a threshold radius. For example, the threshold radius can be 8-10 meters. The threshold radius can differ from access point to access point, based on the distribution pattern of the locations in the set received (e.g., number of location data points received, density of the location data points, and concentration areas in the cells).

The system can designate (332) the geographic area as a circle having the average geographic location as a center and a radius based on at least one calculated distance. The geographic area can be associated with an access point (e.g., access point 105). The server can provide the geographic area (e.g., the center and radius) to a mobile device for calculating a current location of the mobile device. The center can be represented in latitudes and longitudes. In some implementations where distances are calculated in three-dimensional spaces, the center can further be represented in an altitude.

Figure 3C:
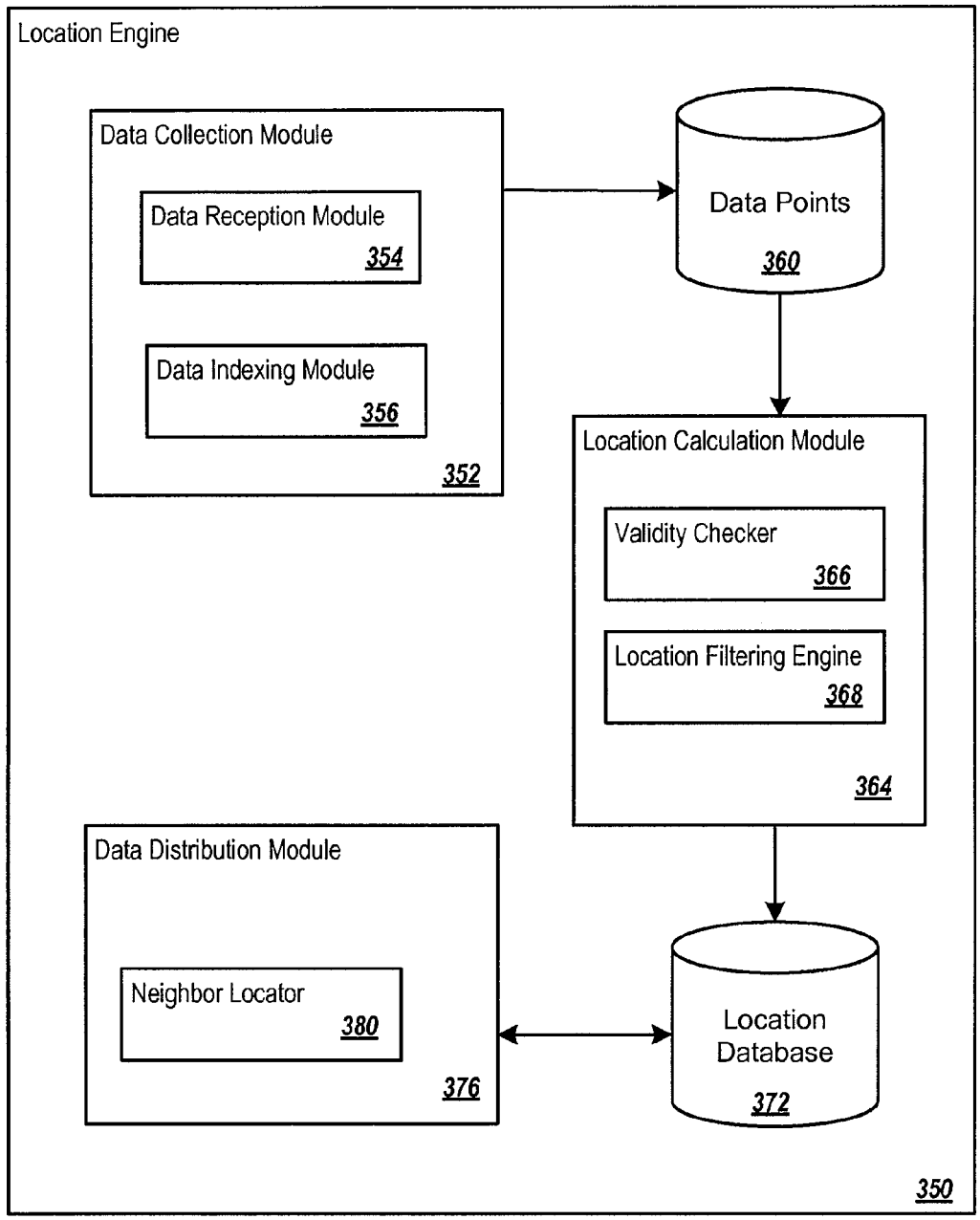
FIG. 3C is a block diagram illustrating an exemplary system implementing techniques of managing a location database.

FIG. 3C is a block diagram illustrating an exemplary system implementing techniques of managing a location database. The system can include one or more processors, one or more memory devices storing instructions, and other hardware or software components. The system can include location engine 350 that can be used to determine a presence area or presence space to be associated with an access point (e.g., access point 105).

Location engine 350 can include data collection module 352 that can receive data from various mobile devices through various access points. The data can include multiple data points that can indicate locations of one or more location-aware mobile devices (e.g., mobile devices 108) as well as identifiers of access points (e.g., MAC addresses of access points 105) indicating to which access point mobile devices 108 are connected. In some implementations, the data points can also include information on which time zone mobile devices 108 are located. Data collection module 352 can include data reception module 354, which can receive data transmitted from mobile devices 108 and data indexing module 356. Data indexing module 356 can perform various processing on the received data points. For example, data indexing module 356 can sort latitudes, longitudes, and altitudes based on cell IDs. Data indexing module 356 can also group data into sets based on time periods. For example, a new set of received locations can be created for a configurable period of time (e.g., six hours).

Sets of received locations of mobile devices 108 can be stored in data point database 360. Data point database 360 can store current and historical locations of various mobile devices 108. Data point database 360 can include an ad-hoc database, relational database, object-oriented database. Data point database 360 can be hosted locally or remotely in relation to location engine 350.

Location calculation module 364 can be utilized to calculate an average geographic location in sets of data points in data points database, calculate distances between the average geographic location and locations of various data points, and exclude locations from the sets for further computation. Location calculation module 364 can perform the calculations for a particular set (e.g., a set of data points associated with a cell ID) until an exit condition is reached for the particular set. Location calculation module 364 can determine presence areas or presence spaces for each access point (e.g., access point 105)

In some implementations, location calculation module 464 can perform validity checks on the presence areas or presence spaces based on various criteria and various data in the data points using validity checker 366. For example, the data points received from mobile devices 108 can include Mobile Country Codes (MCCs) and time zone information. Validity checker 366 can compare a calculated presence area or presence space with polygons corresponding to countries represented by the MCCs and polygons corresponding to the time zones. If a calculated presence area or presence space is located outside the polygons, validity checker 366 can register an anomaly and remove the access point.

Location filtering engine 368 can determine whether a presence area or presence space can be used to estimate a location of a mobile device that is currently located within a communication range of an access point. Location filtering engine 368 can divide a geographic region into cells 102 of geographic grid 100, or three-dimensional cells 122 of three-dimensional grid 120. Location filtering engine 368 can rank presence areas or presence spaces based on popularity, stability, longevity, and freshness. Location filtering engine 368 can assign the top-ranked presence areas or presence spaces located in each cell 102 or three-dimensional cell 122 to cell 102 or three-dimensional cells.

Presence areas and presence spaces can be defined by a center having the average latitude, longitude, and altitude coordinates of the set of locations. Presence areas and presence spaces can be further defined by a radius determined based on distances from locations in the set of locations to the center. The latitude, longitude, and altitude coordinates of centers for the presence areas and presence spaces and the radii of the presence areas and presence spaces can be stored in location database 372. Location database 372 can store both assigned and unassigned presence areas and presence spaces. Unassigned presence areas or presence spaces can be assigned in subsequent calculations by location calculation module 364. Location database 372 can be updated periodically by location calculation module 364.

The data of location database 372 can be distributed to mobile devices using data distribution module 376. Data distribution module 376 can send information of assigned presence areas and presence spaces (e.g., center coordinates and radii) that is associated with access points to mobile devices (e.g., non-GPS-enabled mobile device 110) upon request, through broadcasting, or using various push technology without receiving requests from the mobile devices.

In some implementations, data distribution module 376 can send multiple presence areas and presence spaces to mobile devices in one transmission session. To reduce the number of location transmissions to the mobile devices that can consume communication bandwidths of the mobile device, data distribution module 376 can use neighbor locator 378 to locate cells that neighbors of the cell in which mobile device 110 is located. Neighboring cells can include, for example, a number of cells surrounding the cell in which mobile device 110 is located such that the total area of the cell and the surrounding cells cover a certain geographic area (e.g., one or two squire kilometers). Sending information on presence areas and presence spaces associated with multiple cells (e.g., 400 cells) to mobile device 110 can reduce the number of transmissions when mobile device 110 moves across cells. In such implementations, data distribution module 376 only needs to send an update to mobile device 110 when mobile device 110 moves out of all cells previously sent.

Figure 4A:
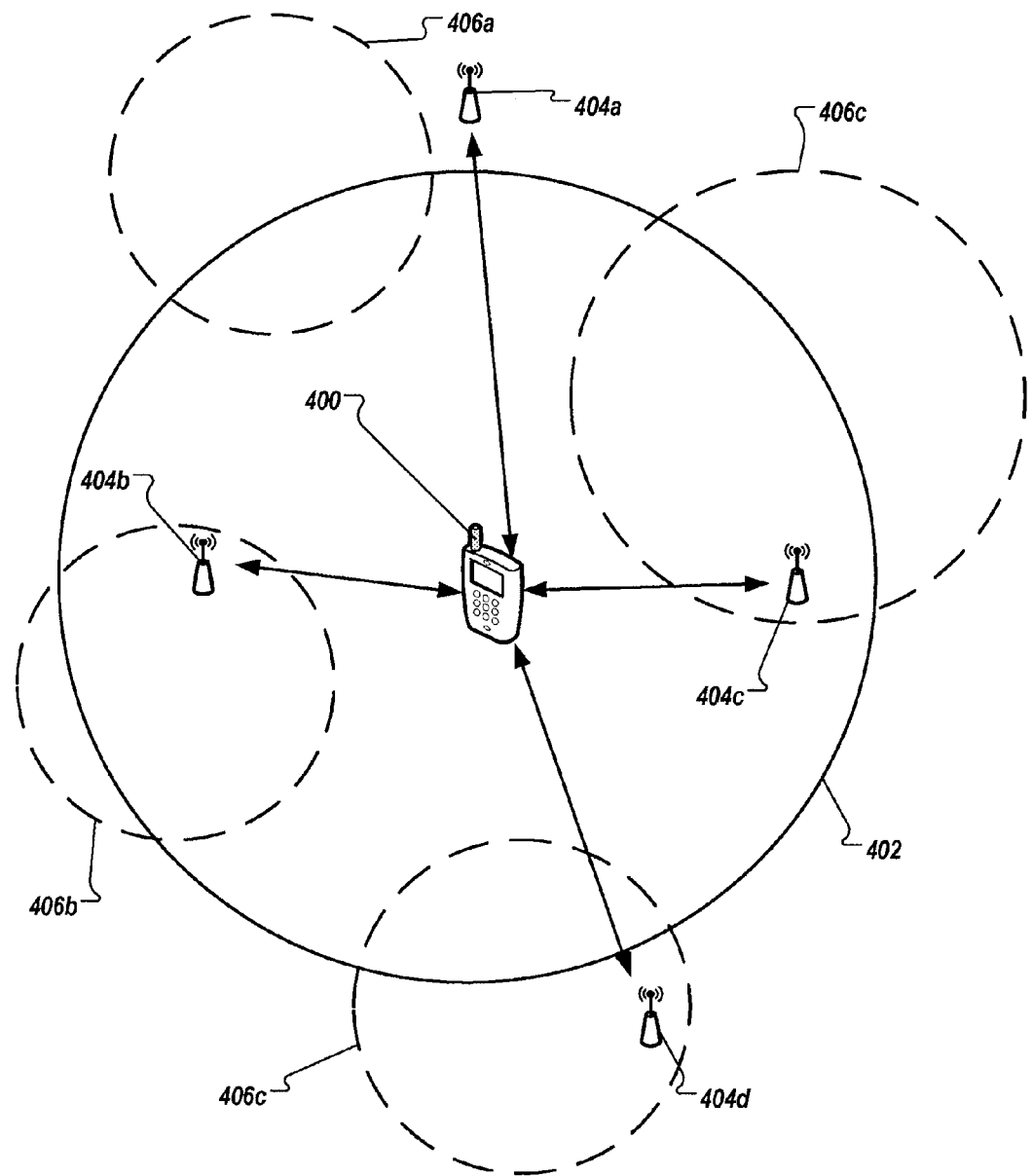
FIG. 4A illustrates techniques for determining locations of mobile devices using a location database in network-based positioning system.

Exemplary Process for Determining Locations of Mobile Devices Using a Location Database FIG. 4A illustrates techniques for determining locations of mobile devices using locations of wireless access points. Mobile device 400 can be an exemplary mobile device that can use locations of wireless access points to determine its location. An exemplary section of a communication network that includes access points 400 is illustrated.

Mobile device 400 can be located within a communication range of access point 404*a*. From access point 404*a*, mobile device 400 can receive data that includes information on presence areas or presence spaces (including presence areas 406) of neighboring access points. Mobile device 400 can store the received data in a location database. The location database can be hosted on a storage device of mobile device 400. The stored data can be updated periodically or upon request.

In the example shown, mobile device 400 is located within a communication range of access point 400*a*. In addition, mobile device 400 is within communication ranges to access points 404*b*, 404*c*, and 404*d*. Mobile devices 400 can identify access points 404*a*, 404*b*, 404*c*, and 404*d* under wireless communication protocols used in the WLAN (e.g., IEEE 802.11a). Access points 404*a*, 404*b*, 404*c*, and 404*d* can be identified by MAC addresses of the access points or other identifiers (e.g., Bluetooth™ identifiers).

Mobile device 400 can identify presence areas 406*a*, 406*b*, 406*c*, and 406*d* that are associated with access points 404*a*-*d*, respectively. Identifying presence areas 406*a*-*d* can include retrieving information on the presence areas 406*a*-*d* from a memory device coupled to mobile device 400. In some implementations, mobile device 400 can request from a server the presence areas 406*a*-*d* by sending to the server identifiers of access points 404*a*-*d*.

Based on presence areas 406*a*-*d*, mobile device 400 can execute an iterative process (e.g., a multi-pass analysis) on the presence areas 406*a*-*d*. The iterative process can produce geographic area 402, which can be an estimate of mobile device 400's current geographic location. Geographic area 402 can be a geographic space when three-dimensional location information is utilized. Mobile device 400 can display the estimated current location on a display device (e.g., on a map display).

Figure 4B:
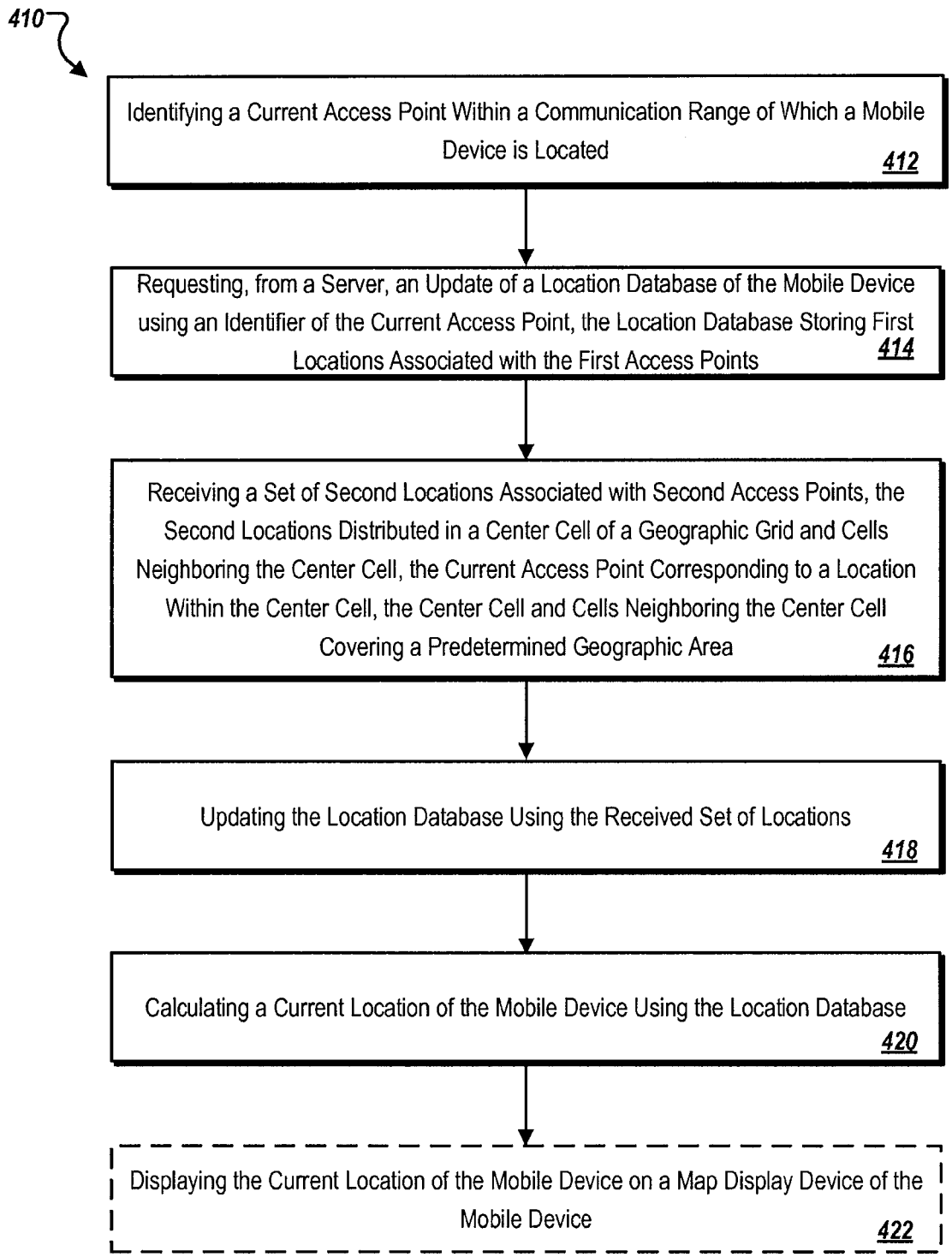
FIG. 4B is a flowchart illustrating an exemplary process of determining a location of a mobile device using a location database.

FIG. 4B is a flowchart illustrating exemplary process 410 of determining a location of a mobile device using a location database. For convenience, process 410 will be described in reference to mobile device 400 that implements process 410.

Mobile device 400 can identify (412) a current access point within a communication range of which mobile device 400 is located. Mobile device 400 can use the current access point to determine whether to request an update of a location database that is hosted on mobile device 400. The location database hosted on mobile device 400 can include records of access points previously downloaded to mobile device 400. The records in the location database hosted on mobile device 400 can include identifiers of access points (e.g., MAC addresses) and corresponding locations (e.g., latitude/longitude coordinates).

In stage 412, mobile device 400 can determine whether the current access point is included in the records of the location database. Mobile device can perform a lookup of the location database using an identifier (e.g., a MAC address) of the current access point within a communication range of which mobile device 400 is located. If the current access point is included in the records of the location database, mobile device can determine that the location database is up-to-date. If the current access point is not included in the records of the location database, mobile device 400 can determine that the location database needs update.

Mobile device 400 can request (414) from a server an update of the location database of mobile device 400 using the identifier of the current access point. The records in the location database, including identifiers and locations of access points, can be refreshed using new identifiers and locations of new access points. Mobile device 400 can send the identifier of the current access point to the server. The server can identify a cell as a center cell in a geographic grid. A center cell can be a cell that includes a location associated with the identifier of the current access point to the server, and sends all access point locations in the cell and in neighboring cells to mobile device 400. The server can use the center cell as a starting point to locate neighboring cells. While the center cell can be an anchor of a group of cells including the center cell and the neighboring cells, the center cell is not required to be located at an exact geographic center of the group of cells. For example, the center cell can be a cell located on an oceanfront, where all neighboring cells can be located on one side of the center cell.

Mobile device 400 can receive (416) a set of second locations associated with second access points. The second access points can be distributed in the center cell and cells neighboring the center cell on the geographic grid. The location associated with the current access point (e.g., a center of a circular area) can be located in the center cell. The neighboring cells can be cells that are located next to or closest to the center cell on the geographic grid. The number of neighboring cells can have a value such that the center cell and the neighboring cells can cover a predetermined geographic area (e.g., 1.5 square kilometers). Identifiers of the access points and locations associated with the access points can be included in the update when the locations associated with the access points are within the geographic area covered by the center cell and the neighboring cells. One exemplary advantage of updating the location on mobile device 400 when the current access point is not included in the records of the location database is that when mobile device 400 moves from cell to cell, no update is necessary until mobile device 400 moves out of a large area compared to the coverage area of a single access point. Thus, frequent updates can be avoided, saving resources both for mobile device 400 (e.g., bandwidth, CPU cycle, battery power) and server (e.g., the server does not need to send frequent updates to a large number of mobile devices when the devices move from one street block to next).

Mobile device 400 can update (418) the location database hosted on mobile device 400 using the received set of locations and identifiers of access points. The update can "center" mobile device 400 at the geographic area covered by the center cell and the neighboring cells. Mobile device 400 may not need to request another update until mobile device 400 moves from the center cell to a cell not covered by one of the neighboring cells. For example, if each cell is approximately 50 meters by 50 meters, and the predetermined geographic area is 1.5 square kilometers, each update can inject approximately 600 cells into the location database of mobile device 400. Mobile device 400 may not need to request another update unless mobile device moves out of the area covered by the 600 cells.

Mobile device 400 can calculate (420) a current location of mobile device 400 using the location database hosted on mobile device 400. The calculation can be performed using an adaptive multi-pass process executed by mobile device 400. Further details of the multi-pass process will be described below with respect to FIG. 4C. Although other factors (e.g., signal strength from various access points) can assist the calculation of the current location, those factors are not required in the calculation.

Mobile device 400 can optionally display (422) the current location of mobile device 400 on a map display device of mobile device 400. Example display of the current location will be described in further detail below, with respect to FIG. 5.

Figure 4C:
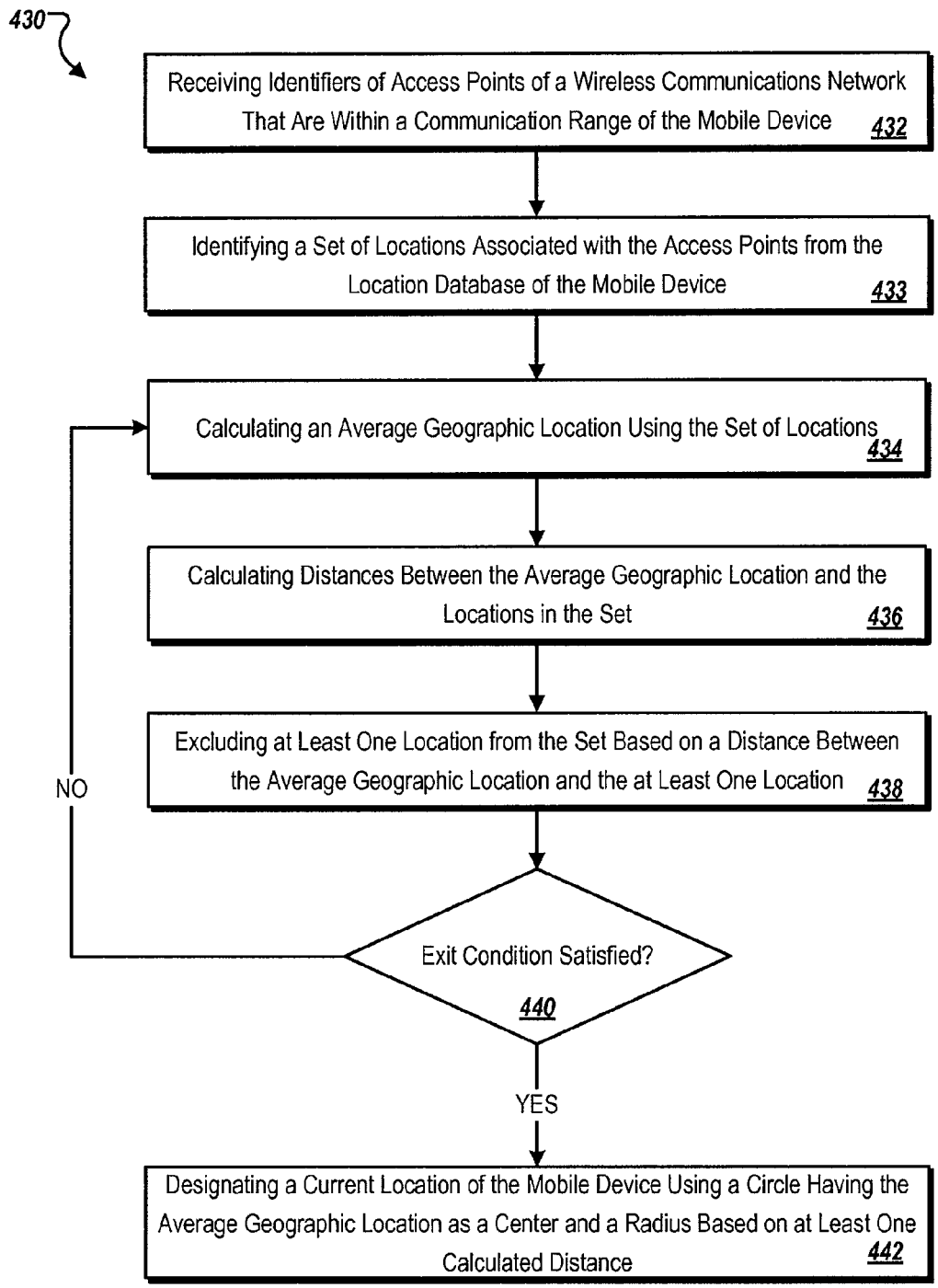
FIG. 4C is a flowchart illustrating an exemplary adaptive multi-pass process of determining a location of a mobile device.

FIG. 4C is a flowchart illustrating exemplary adaptive multi-pass process 430 of determining a location of a mobile device. For convenience, process 430 will be described in reference to mobile device 400 that implements process 430.

Mobile device 400 can receive (432) identifiers of access points (e.g., access points 404) of a wireless communication network (e.g., a WLAN). The access points can be located within a communication range of mobile device 400. The identifiers need not be associated with access points to which mobile device 400 is connected or can connect. For example, at a particular location, mobile device 400 can be within communication range of between three to 20 access points. Mobile device 400 may be capable of connecting to only two of the access points (due to, for example, security settings of the access points and mobile device 400). Mobile device 400 may be actively connected to only one of the two access points, or no access point at all. However, all identifiers of the access points received by mobile device 400 can be used in the calculation.

Mobile device 400 can identify (433) a set of locations associated with the access points from the location database of mobile device 400. The set of locations can correspond to presence areas 406 or presences spaces associated with the access point. Each location can be represented by geographic coordinates (e.g., latitude, longitude, and altitude). Each location can be associated with an identifier (e.g., a MAC address) of an access point 404. Mobile device 400 can identify the locations using a database lookup.

Mobile device 400 can calculate (434) an average geographic location using the locations in the set. Calculating the average geographic location can include calculating an average of latitudes, longitudes, and altitudes of the locations in the set, and designating a position at the calculated average latitude, longitude, and altitude as the average geographic location. In some implementations, calculating the average geographic location can include designating a location at a median latitude, median longitude, and median altitude of the positions in the set as the average geographic location.

Mobile device 400 can calculate (436) distances between the locations in the set and the average geographic location. In some implementations, the system can calculate a linear distance between each of the locations in the set and the average geographic location in Euclidean space. In some implementations, the system can calculate a geodesic distance between each of the locations in the set and the average geographic location, taking curvature of the earth into consideration.

The distances calculated in stage 436 can be designated as a radius associated with a center. The center can be the average geographic location calculated in stage 434, which can be a center of a circle (e.g., circle surrounding geographic area 402). The radius of the circle can be determined based on at least one distance between a location in the set of locations and the average geographic location. In some implementations, the radius can equal to the longest distance between the average geographic location and a location remaining in the set. In some implementations, the radius can be a distance that, when a circle is drawn using the radius and the average geographic location as a center, the circle can enclose a percentage (e.g., 80 percent) of the locations remaining in the set. The radius can represent a margin of error beyond which an estimation of a location of a non-GPS-enabled mobile device is less likely to be statistically meaningful.

Mobile device 400 can exclude (438) from the set at least one location based on a distance between the average location and the location. In some implementations, the system can exclude locations whose distance to the average geographic location exceeds a threshold distance. In each pass of the multi-pass analysis, the system can increase a precision of the estimated average geographic location by excluding locations that appear to be away from a concentration of locations (e.g., a cluster). A location that is away from a cluster of locations can be less useful in estimating a current location of mobile device 400, and can be excluded. In various implementations, the threshold distance can vary from one pass to a next pass. For example, the threshold distance can be a set of distances corresponding to the passes (e.g., 50 meters for the first pass, 30 meters for the second pass, etc.). The system can exclude at least one location from the set when the distance between the average geographic location and the location exceeds the threshold distance.

In some implementations, mobile device 400 can determine a threshold percentage of locations to be excluded. The threshold percentage can have a pre-specified value (e.g., five percent). In each pass, mobile device 400 can exclude the threshold percentage of locations that are located farthest from the average geographic location.

Mobile device 400 can repeat stages 434, 436, and 438 of process 430 until an exit condition is satisfied. The system can determine (440) whether an exit condition is satisfied for terminating the repetition. In some implementations, the exit condition can be satisfied when a number of repetitions reach a threshold number (e.g., five times). The threshold number can relate to a number of locations in the originally received set. The threshold number, as well as the percentage of locations to exclude, can be configurable to fine tune a balance between certainty (e.g., a larger presence area can result in more confidence that a mobile device in the cell is actually located in the presence area) and precision (e.g., a smaller presence area can result in more accurate location of a mobile device). For example, when the percentage is set to 95 percent and the number of passes is set to 10, the final pass can produce a circle that encompasses about 60 percent of all location data points.

In some implementations, the exit condition of stage 330 can be satisfied when the presence area or presence space is sufficiently small. In areas where access points 404 are highly concentrated, an estimated current location can include an area sufficiently small that further passes will not necessarily increase the precision. The repetition of stages 434, 436, and 438 can terminate when the radius of the circle reaches below a threshold radius. For example, the threshold radius can be 8-10 meters. The threshold radius can be based on radii of presence areas 406. In some implementations, if some radii of presence areas 406 are sufficiently small, the threshold radius can be small, to reflect a confidence on the estimate.

Mobile device 400 can designate (442) the current location of mobile device 400 using a circle having the average geographic location as a center and a radius based on at least one calculated distance. The center can be represented in latitudes and longitudes. In some implementations where distances are calculated in three-dimensional spaces, the center can further be represented in an altitude. In some implementations, mobile device can further display the current location on a display device on a map user interface. Exemplary map user interfaces will be described below in reference to FIG. 5.

Exemplary User Interfaces for Determining Locations of Mobile Devices

Figure 5:
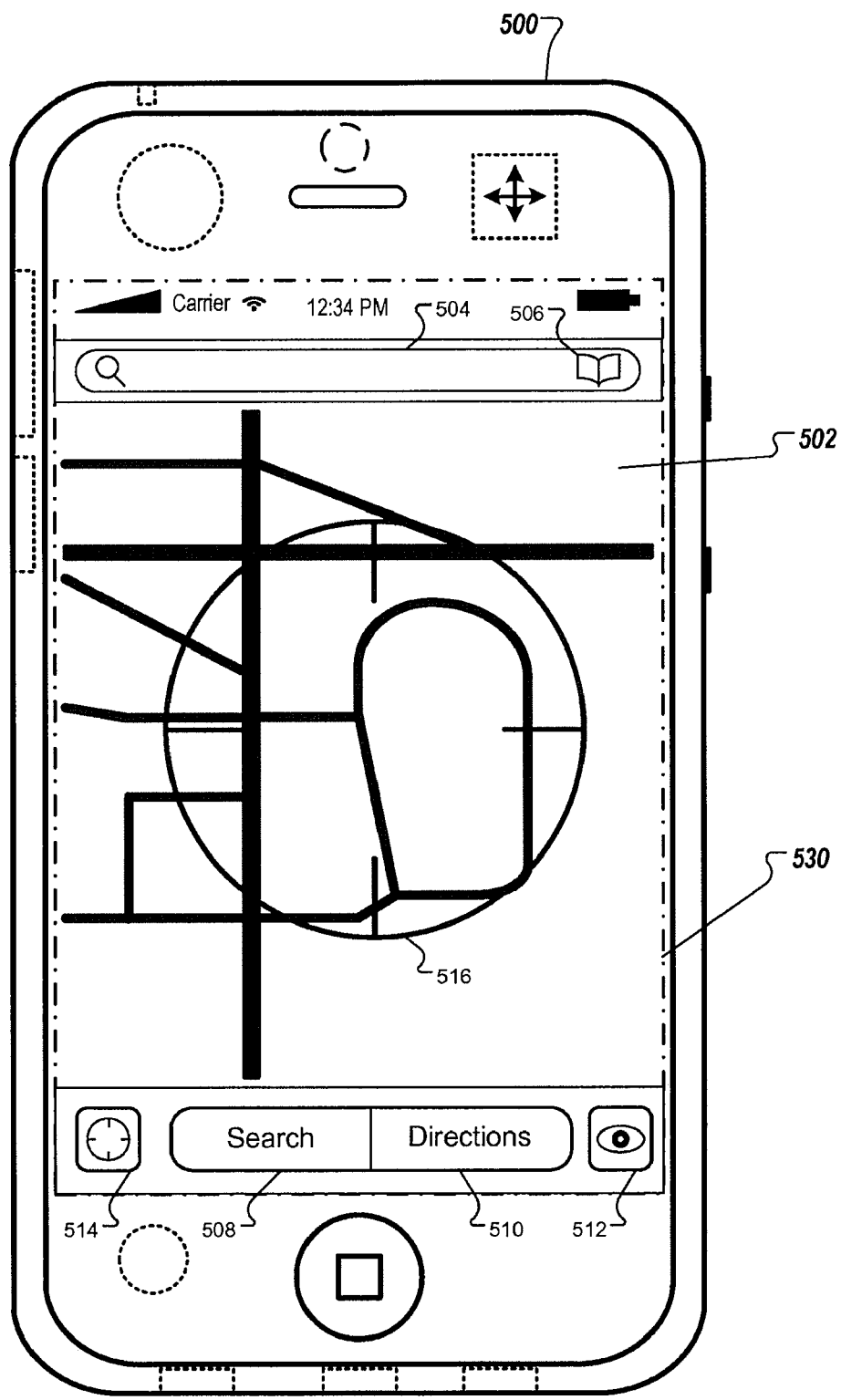
FIG. 5 illustrates an exemplary user interface for determining locations of mobile devices using locations of wireless access points.

FIG. 5 illustrates an exemplary user interface for determining locations of mobile devices using locations of wireless access points. In FIG. 5, example map 502 of a geographic area is displayed on mobile device 500. In some implementations, mobile device 500 can display map 502 on the touch sensitive display 530 of mobile device 500. Map 502 can be displayed when a user selects a map object to view mapping and location based services. In some implementations, objects, such as a map object, can be selected by voice activation. A search bar 504 and a bookmarks list object 506 can be displayed at the top of the map 502. Below the bottom of the map one or more display objects can be displayed, for example a search object 508, a directions object 510, a map view object 512, and a current location object 514.

The search bar 504 can be used to find an address or other location on the map. For example, a user can enter their home address in the search bar 504, and the region containing the address would be displayed on the map 502. The bookmarks list object 506 can, for example, bring up a Bookmarks list that contains addresses that are frequently visited, such as a user's home address. The Bookmarks list can also, for example, contain special bookmarks such as the current location (e.g. the current location of mobile device 500).

The search object 508 can be used to display the search bar 504 and other map related search menus. The directions object 510 can, for example, bring up a menu interface that allows the user to enter a start and end location. The interface can then display information (e.g., directions and travel time for a route from the start location to the end location). The map view object 512 can bring up a menu that will allow the user to select display options for the map 502. For example, the map 502 can be changed from black and white to color, the background of the map can be changed, or the user can change the brightness of the map.

The current location object 514 can allow the user to see a geographic area 516 on the map 502 indicating where device 500 is currently located. Geographic area 516 can correspond to an estimated geographic area (e.g., geographic area 402) whose center is an average geographic location of data points associated with access points that are within communication range of mobile device 500. Radius of geographic area 516 can be determined based on a distance between the average geographic location and one or more locations associated with the access points. A special current location bookmark can be placed in the Bookmarks list when the current location object 514 is selected. If the special current location bookmark was previously set in the Bookmarks list, the old bookmark information can, for example, be replaced with the new current location information. In some implementations, the special current location bookmark is tied to the centroid of geographic area 516. That is, the special current location bookmark can include the coordinates for the centroid of the geographic area 516. The geographic area 516 can be based on location data determined or estimated using location instructions stored in a memory device of mobile device 500. The geographic area 516 can, for example, be depicted by a circle, rectangle, square, hexagon, or other enclosed region with crosshairs, or some other distinctive element to differentiate the geographic area 516 from the map 502.

In some implementations, geographic area 516 can indicate a region in which mobile device 500 is determined or estimated to be located, and the geographic area may not necessarily be centered on the actual current position of mobile device 500. In this example, mobile device 500 may be located off-center within the geographic area. In another example, geographic area 516 can be centered on an estimated current position of mobile device 500.

Mobile device 500 can, for example, center the map view on the geographic area 516 when the current location object 514 is tapped or otherwise selected. In some implementations, the zoom level of the map can be adjusted based on the accuracy or precision of the location data or the technology, system, or service that provided the location data. For example, the map can be zoomed out when mobile device 500 cannot receive GPS signals for lower accuracy and uses access point data to determine its location. The map can be zoomed in for higher accuracy if mobile device 500 is capable of using GPS location data to determine its current location. In some implementations, the zoom level can be based on the velocity of mobile device 500 (e.g., the map can be zoomed out at higher velocities and zoomed in when mobile device 500 is not moving). A combination of accuracy or precision and velocity can also be used.

If all methods for retrieving location-based data fail (e.g., when mobile device 500 is not within communication range of any access point, or when validity checker 366 determines that no presence area can be associated with any access points where mobile device 500 can be connected), and there are no other systems or services available for determining or estimating the current position of mobile device 500, an error can be displayed to the user and no geographic area is displayed on the map 502. The error can, for example, contain a message to the user informing them of the failure and the possible reason or reasons for the failure.

Current location object 514 can be selected, for example, to activate the estimating and displaying of geographic area 516 on map 502, to get directions to or from the estimated current location (i.e., the centroid of geographic area 516), to send the estimated current location of mobile device 500 to a friend (e.g., such that the friend can go to the same location), or to create a bookmark for the estimated current location.

Exemplary System Architecture

Figure 6:
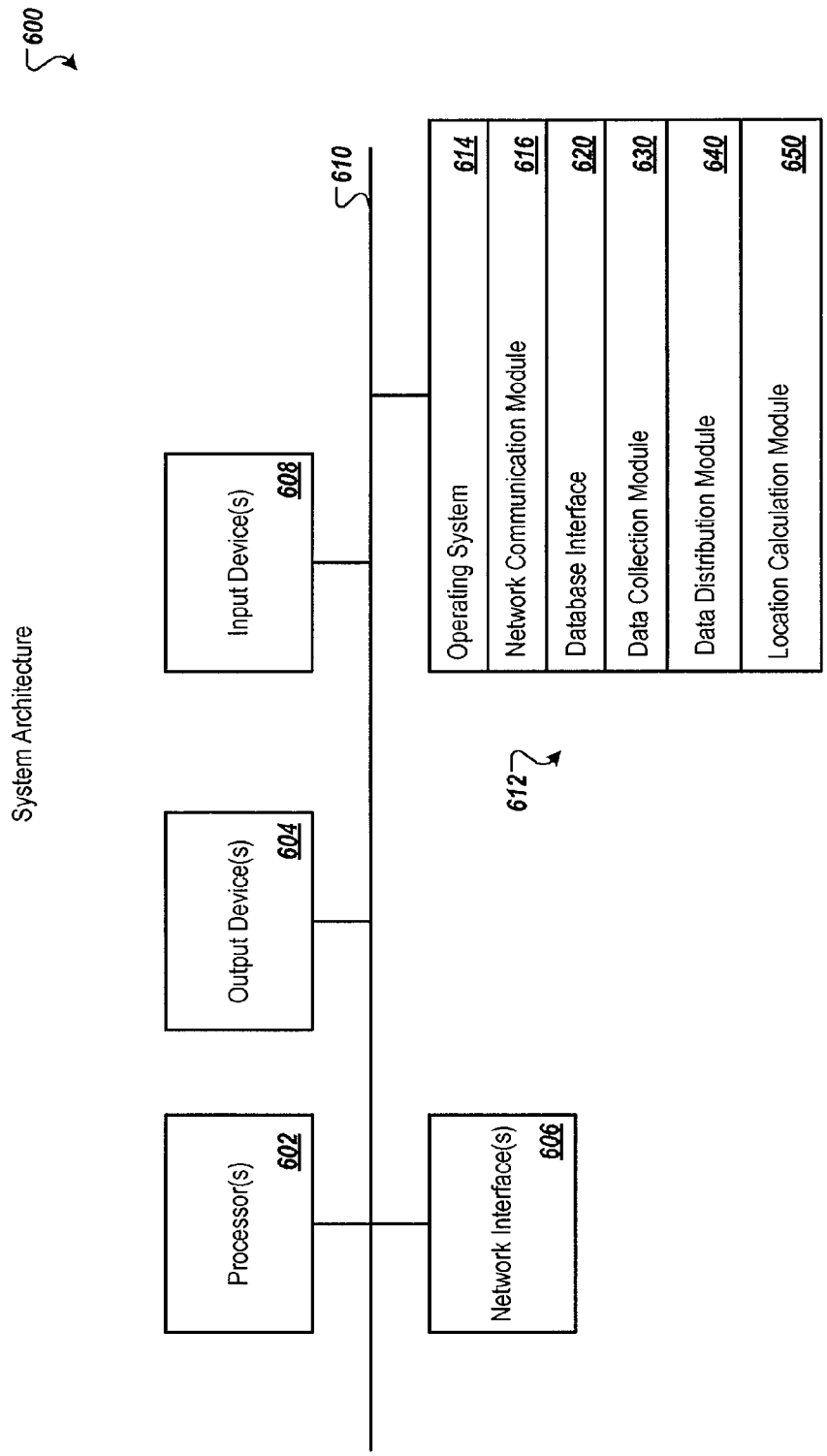
FIG. 6 is a block diagram of an exemplary system architecture for implementing the features and operations described in reference to FIGS. 1-5.

FIG. 6 is a block diagram of an exemplary system architecture 600 for implementing the features and operations described in reference to FIGS. 1-5. Other architectures are possible, including architectures with more or fewer components. In some implementations, architecture 600 includes one or more processors 602 (e.g., dual-core Intel® Xeon® Processors), one or more output devices 604 (e.g., LCD), one or more network interfaces 606, one or more input devices 608 (e.g., mouse, keyboard, touch-sensitive display) and one or more computer-readable mediums 612 (e.g., RAM, ROM, SDRAM, hard disk, optical disk, flash memory, etc.). These components can exchange communications and data over one or more communication channels 610 (e.g., buses), which can utilize various hardware and software for facilitating the transfer of data and control signals between components.

The term "computer-readable medium" refers to any medium that participates in providing instructions to processor 602 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium 612 can further include operating system 614 (e.g., Mac OS® server, Windows® NT server), network communication module 616, database interface 620, data collection module 630, data distribution module 640, and location calculation module 650, as described in reference to FIGS. 1-5. Operating system 614 can be multi-user, multiprocessing, multitasking, multithreading, real time, etc. Operating system 614 performs basic tasks, including but not limited to: recognizing input from and providing output to devices 606, 608; keeping track and managing files and directories on computer-readable mediums 612 (e.g., memory or a storage device); controlling peripheral devices; and managing traffic on the one or more communication channels 610. Network communications module 616 includes various components for establishing and maintaining network connections (e.g., software for implementing communication protocols, such as TCP/IP, HTTP, etc.). Database interface 620 can include interfaces to one or more databases (e.g., data point database 360 and location database 372) on a file system. The databases can be organized under a hierarchical folder structure, the folders mapping to directories in the file system. Data collection module 630 can include components for collecting data from multiple mobile devices wirelessly connected to system 600 through access points or through other communication channels (e.g., cellular networks). Data distribution module 640 can perform various functions for transmitting location data in association with access points of a wireless communications network to computing devices, including mobile devices 108 and 110. Location calculation module 650 can include one or more components for performing multi-pass analysis on locations received from mobile devices 108.

Architecture 600 can be included in any device capable of hosting a database application program. Architecture 600 can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

Exemplary Mobile Device Architecture

Figure 7:
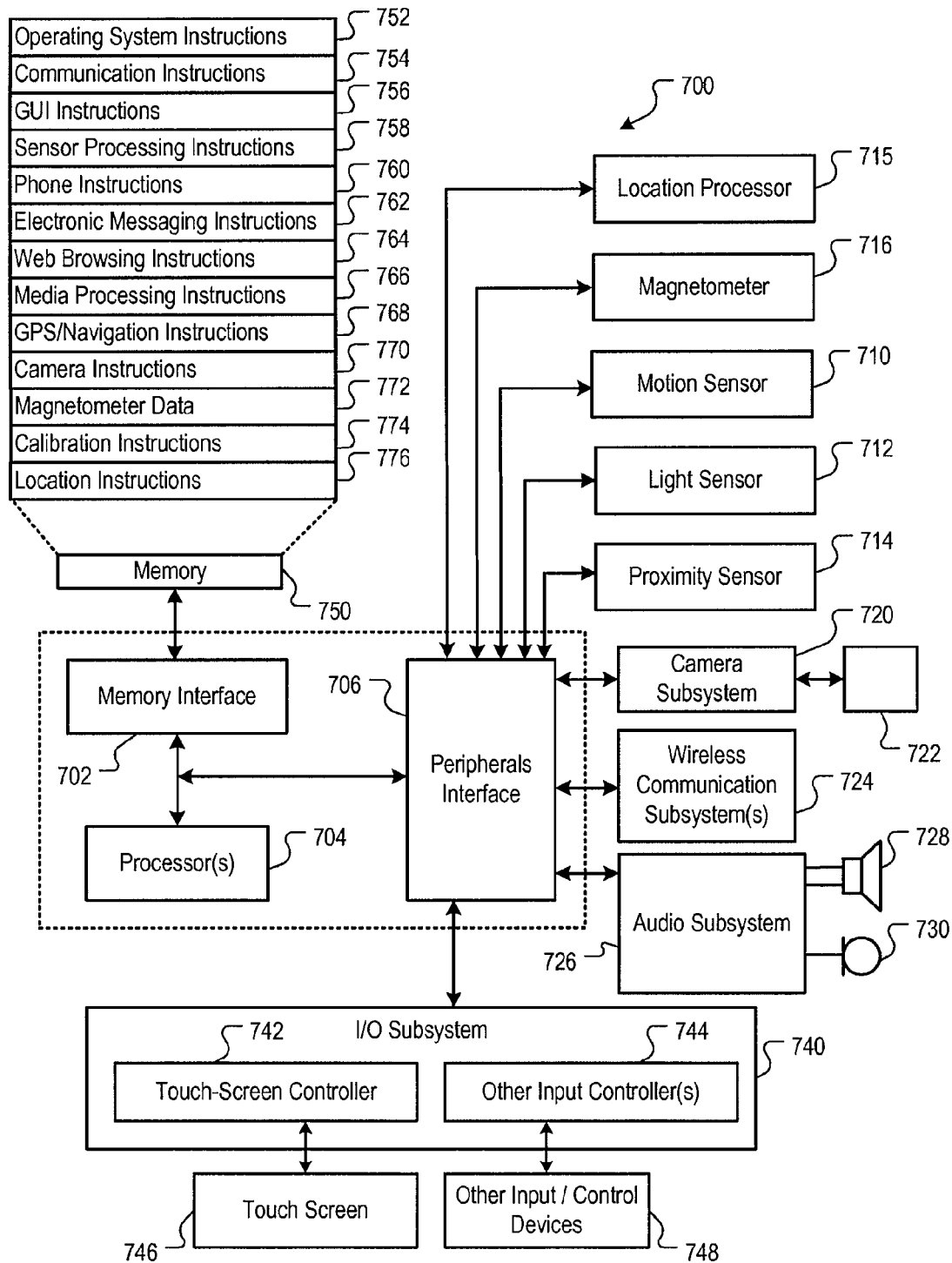
FIG. 7 is a block diagram of an exemplary architecture of a mobile device.

FIG. 7 is a block diagram of an exemplary architecture 700 of a mobile device. The Mobile device can be, for example, a handheld computer, a personal digital assistant, a cellular telephone, an electronic tablet, a network appliance, a camera, a smart phone, an enhanced general packet radio service (EGPRS) mobile phone, a network base station, a media player, a navigation device, an email device, a game console, or a combination of any two or more of these data processing devices or other data processing devices.

The mobile device can include a memory interface 702, one or more data processors, image processors and/or central processing units 704, and a peripherals interface 706. The memory interface 702, the one or more processors 704 and/or the peripherals interface 706 can be separate components or can be integrated in one or more integrated circuits. The various components in the mobile device 100 can be coupled by one or more communication buses or signal lines.

Sensors, devices, and subsystems can be coupled to peripherals interface 706 to facilitate multiple functionalities. For example, motion sensor 710, light sensor 712, and proximity sensor 714 can be coupled to peripherals interface 706 to facilitate orientation, lighting, and proximity functions of the mobile device. Location processor 715 (e.g., GPS receiver) can be connected to peripherals interface 706 to provide geopositioning. Electronic magnetometer 716 (e.g., an integrated circuit chip) can also be connected to peripherals interface 706 to provide data that can be used to determine the direction of magnetic North.

Camera subsystem 720 and an optical sensor 722, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 724, which can include radio frequency receivers and transmitters and/or optical (e.g., infrared) receivers and transmitters. The specific design and implementation of the communication subsystem 724 can depend on the communication network(s) over which the mobile device is intended to operate. For example, the mobile device may include communication subsystems 724 designed to operate over a GSM network, a GPRS network, an EDGE network, a Wi-Fi or WiMax network, and a Bluetooth network. In particular, the wireless communication subsystems 724 may include hosting protocols such that the device may be configured as a base station for other wireless devices.

Audio subsystem 726 can be coupled to a speaker 728 and a microphone 730 to facilitate voice-enabled functions, such as voice recognition, voice replication, digital recording, and telephony functions.

I/O subsystem 740 can include a touch screen controller 742 and/or other input controller(s) 744. Touch-screen controller 742 can be coupled to a touch screen 746 or pad. Touch screen 746 and touch screen controller 742 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 746.

Other input controller(s) 744 can be coupled to other input/control devices 748, such as one or more buttons, rocker switches, thumb-wheel, infrared port, USB port, and/or a pointer device such as a stylus. The one or more buttons (not shown) can include an up/down button for volume control of speaker 728 and/or microphone 730.

In one implementation, a pressing of the button for a first duration may disengage a lock of the touch screen 746; and a pressing of the button for a second duration that is longer than the first duration may turn power to the mobile device on or off. The user may be able to customize a functionality of one or more of the buttons. The touch screen 746 can, for example, also be used to implement virtual or soft buttons and/or a keyboard.

In some implementations, the mobile device can present recorded audio and/or video files, such as MP3, AAC, and MPEG files. In some implementations, the mobile device can include the functionality of an MP3 player, such as an iPod™. The mobile device may, therefore, include a pin connector that is compatible with the iPod. Other input/output and control devices can also be used.

Memory interface 702 can be coupled to memory 750. Memory 750 can include high-speed random access memory and/or non-volatile memory, such as one or more magnetic disk storage devices, one or more optical storage devices, and/or flash memory (e.g., NAND, NOR). Memory 750 can store operating system 752, such as Darwin, RTXC, LINUX, UNIX, OS X, WINDOWS, or an embedded operating system such as VxWorks. Operating system 752 may include instructions for handling basic system services and for performing hardware dependent tasks. In some implementations, operating system 752 can include a kernel (e.g., UNIX kernel).

Memory 750 may also store communication instructions 754 to facilitate communicating with one or more additional devices, one or more computers and/or one or more servers. Memory 750 may include graphical user interface instructions 756 to facilitate graphic user interface processing; sensor processing instructions 758 to facilitate sensor-related processing and functions; phone instructions 760 to facilitate phone-related processes and functions; electronic messaging instructions 762 to facilitate electronic-messaging related processes and functions; web browsing instructions 764 to facilitate web browsing-related processes and functions; media processing instructions 766 to facilitate media processing-related processes and functions; GPS/Navigation instructions 768 to facilitate GPS and navigation-related processes and instructions; camera instructions 770 to facilitate camera-related processes and functions; magnetometer data 772 and calibration instructions 774 to facilitate magnetometer calibration. Memory 750 can include location instructions 776 that can be used to transmit a current location to an access point, and to determine an estimated current location based on location data associated with access points to which the mobile device is within a communication range. Memory 750 can also store other software instructions (not shown), such as security instructions, web video instructions to facilitate web video-related processes and functions, and/or web shopping instructions to facilitate web shopping-related processes and functions. In some implementations, the media processing instructions 766 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 750.

Each of the above identified instructions and applications can correspond to a set of instructions for performing one or more functions described above. These instructions need not be implemented as separate software programs, procedures, or modules. Memory 750 can include additional instructions or fewer instructions. Furthermore, various functions of the mobile device can be implemented in hardware and/or in software, including in one or more signal processing and/or application specific integrated circuits.

A number of implementations of the invention have been described. Nevertheless, it will be understood that various modifications can be made without departing from the spirit and scope of the invention. For example, the location-aware devices are referred to as GPS-enabled. Location-aware mobile devices can also be based triangulation or other technology. Cells are represented as substantially rectangular in shape in the figures. The actual shape of a cell can vary. Locations are described as "circles." The term "circle" used in this specification can include any geometric shape (e.g., an ellipsis, a square, a convex or concave polygon, or a free-style shape) that need not be perfectly circular but is closed or has an appearance of an enclosure. The radius of a geometric shape that is not perfectly circular can include an average distance between various points on the boundary of the geometric shape and a center of the geometric shape. WiFi and WiMax networks are used as examples. Other wireless technology (e.g., cellular network) can also be employed. Accordingly, other implementations are within the scope of the following claims.

What is claimed is:

1. A computer-implemented method executed by a mobile device, comprising:
    identifying a current access point within a communication range of which the mobile device is located;
    requesting, from a server, an update of a location database of the mobile device using an identifier of the current access point, the location database storing first locations associated with first access points;
    receiving a set of second locations associated with second access points, the second locations distributed in a center cell of a geographic grid and cells neighboring the center cell of the geographic grid, the current access point corresponding to a location within the center cell, the center cell and cells neighboring the center cell covering a predetermined geographic area;
    updating the location database using the received set of locations; and
    calculating a current location of the mobile device using the location database.

2. The method of claim 1, where calculating a current location of the mobile device using the location database comprises:
    (a) receiving identifiers of access points that are within a communication range of the mobile device;
    (b) identifying a set of third locations associated with the access points from the location database of the mobile device;
    (c) calculating an average geographic location using the set of third locations;
    (d) calculating distances between the average geographic location and third locations in the set;
    (e) excluding at least one third location from the set based on a distance between the average geographic location and the at least one third location;
    (f) repeating (c), (d), and (e) until an exit condition is satisfied; and
    (g) designating the current location of the mobile device using a circle having the average geographic location as a center and a radius based on at least one calculated distance.

3. The method of claim 2, where excluding the at least one third location from the set includes:
    determining a threshold percentage of third locations to be excluded; and
    excluding the threshold percentage of third locations that are located farthest from the average geographic location.

4. The method of claim 2, where the exit condition is satisfied when a number of repetitions reaches a threshold number.

5. The method of claim 2, where the exit condition is satisfied when the radius of the circle reaches below a threshold radius.

6. The method of claim 2, where each of the third locations in the set includes a latitude, a longitude, and an altitude.

7. The method of claim 1, further comprising displaying the current location of the mobile device on a map display of the mobile device.

8. The method of claim 1, where the identifiers of the access points include Media Access Control (MAC) addresses of the access points.

9. A system, comprising:
a mobile device configured to perform operations comprising:
identifying a current access point within a communication range of which the mobile device is located;
requesting, from a server, an update of a location database of the mobile device using an identifier of the current access point, the location database storing first locations associated with first access points;
receiving a set of second locations associated with second access points, the second locations distributed in a center cell of a geographic grid and cells neighboring the center cell of the geographic grid, the current access point corresponding to a location within the center cell, the center cell and cells neighboring the center cell covering a predetermined geographic area;
updating the location database using the received set of locations; and
calculating a current location of the mobile device using the location database.

10. The system of claim 9, where calculating a current location of the mobile device using the location database comprises:
(a) receiving identifiers of access points that are within a communication range of the mobile device;
(b) identifying a set of third locations associated with the access points from the location database of the mobile device;
(c) calculating an average geographic location using the set of third locations;
(d) calculating distances between the average geographic location and third locations in the set;
(e) excluding at least one third location from the set based on a distance between the average geographic location and the at least one third location;
(f) repeating (c), (d), and (e) until an exit condition is satisfied; and
(g) designating the current location of the mobile device using a circle having the average geographic location as a center and a radius based on at least one calculated distance.

11. The system of claim 10, where excluding the at least one third location from the set includes:
determining a threshold percentage of third locations to be excluded; and
excluding the threshold percentage of third locations that are located farthest from the average geographic location.

12. The system of claim 10, where the exit condition is satisfied when a number of repetitions reaches a threshold number.

13. The system of claim 10, where the exit condition is satisfied when the radius of the circle reaches below a threshold radius.

14. The system of claim 10, where each of the third locations in the set includes a latitude, a longitude, and an altitude.

15. The system of claim 9, the operations further comprising displaying the current location of the mobile device on a map display of the mobile device.

16. The system of claim 9, where the identifiers of the access points include Media Access Control (MAC) addresses of the access points.

17. A computer program product tangibly stored on a storage device, operable to cause a mobile device to perform operations comprising:
identifying a current access point within a communication range of which the mobile device is located;
requesting, from a server, an update of a location database of the mobile device using an identifier of the current access point, the location database storing first locations associated with first access points;
receiving a set of second locations associated with second access points, the second locations distributed in a center cell of a geographic grid and cells neighboring the center cell of the geographic grid, the current access point corresponding to a location within the center cell, the center cell and cells neighboring the center cell covering a predetermined geographic area;
updating the location database using the received set of locations; and
calculating a current location of the mobile device using the location database.

18. The product of claim 17, where calculating a current location of the mobile device using the location database comprises:
(a) receiving identifiers of access points that are within a communication range of the mobile device;
(b) identifying a set of third locations associated with the access points from the location database of the mobile device;
(c) calculating an average geographic location using the set of third locations;
(d) calculating distances between the average geographic location and third locations in the set;
(e) excluding at least one third location from the set based on a distance between the average geographic location and the at least one third location;
(f) repeating (c), (d), and (e) until an exit condition is satisfied; and
(g) designating the current location of the mobile device using a circle having the average geographic location as a center and a radius based on at least one calculated distance.

19. The product of claim 18, where excluding the at least one third location from the set includes:
determining a threshold percentage of third locations to be excluded; and
excluding the threshold percentage of third locations that are located farthest from the average geographic location.

20. The product of claim 18, where the exit condition is satisfied when a number of repetitions reaches a threshold number.

21. The product of claim 18, where the exit condition is satisfied when the radius of the circle reaches below a threshold radius.

22. The product of claim 18, where each of the third locations in the set includes a latitude, a longitude, and an altitude.

23. The product of claim 17, the operations further comprising displaying the current location of the mobile device on a map display of the mobile device.

24. The product of claim 17, where the identifiers of the access points include Media Access Control (MAC) addresses of the access points.

* * * * *